(12) United States Patent  
Ezaki et al.

(10) Patent No.: US 9,228,691 B2  
(45) Date of Patent: Jan. 5, 2016

(54) HYDRAULIC PRESSURE UNIT

(71) Applicant: HITACHI AUTOMOTIVE SYSTEMS, LTD., Atsugi-shi, Kanagawa (JP)

(72) Inventors: Ryuya Ezaki, Atsugi (JP); Hideaki Takahashi, Atsugi (JP); Yuji Oishi, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 461 days.

(21) Appl. No.: 13/678,712

(22) Filed: Nov. 16, 2012

(65) Prior Publication Data

US 2013/0118606 A1    May 16, 2013

(30) Foreign Application Priority Data

Nov. 16, 2011  (JP) .................................. 2011-250216

(51) Int. Cl.
| | |
|---|---|
| F16L 57/00 | (2006.01) |
| B65D 77/20 | (2006.01) |
| F15B 21/00 | (2006.01) |
| C09J 7/02 | (2006.01) |
| B60T 8/36 | (2006.01) |

(52) U.S. Cl.  
CPC ................ F16L 57/00 (2013.01); B60T 8/368 (2013.01); B65D 77/204 (2013.01); B65D 77/2096 (2013.01); C09J 7/02 (2013.01); F15B 21/00 (2013.01); B65D 2577/2066 (2013.01); B65D 2577/2091 (2013.01); Y10T 137/6851 (2015.04)

(58) Field of Classification Search  
CPC . F16L 57/00; B65D 75/5894; B65D 77/2028; B65D 77/2032; B65D 77/204; B65D 77/2056; B65D 77/2096; B65D 2577/2058; B65D 2577/2066; B65D 2577/2091; B65B 7/2871; F15B 21/00  
See application file for complete search history.

(56) References Cited

U.S. PATENT DOCUMENTS

| | | | | |
|---|---|---|---|---|
| 1,977,759 | A | * | 10/1934 | Ford ............................... 222/482 |
| 3,715,856 | A | * | 2/1973 | Borel ............................... 53/487 |
| 5,791,465 | A | * | 8/1998 | Niki et al. ...................... 206/210 |
| 5,904,263 | A | * | 5/1999 | St. Pierre et al. ............. 220/23.4 |
| 7,658,296 | B2 | * | 2/2010 | Van Handel et al. ......... 220/23.4 |
| 8,015,994 | B2 | * | 9/2011 | Sekihara et al. .............. 137/377 |

FOREIGN PATENT DOCUMENTS

JP    2002-339903    11/2002

* cited by examiner

*Primary Examiner* — Kevin Murphy  
(74) *Attorney, Agent, or Firm* — Foley & Lardner LLP

(57) ABSTRACT

In a hydraulic pressure unit, a housing is equipped with a plurality of piping connections having respectively corresponding openings exposed to an external or plurally grouped piping connections; and a protective tape includes one surface onto which a pressure-sensitive adhesive is disposed by means of which the tape is adhered onto an outer surface of the housing, one sheet of the tape covering simultaneously at least two of the openings or plurally grouped piping connections, the protective tape including: a division section dividing and peeling off the protective tape for each of the openings of the piping connections or for each of the groups of the piping connections; and a grip section disposed to be enabled to be gripped by an operator, an adhesion region of the protective tape to the outer surface of the housing by means of the adhesive being disposed on a region excluding the division section.

13 Claims, 5 Drawing Sheets

HYDRAULIC PRESSURE UNIT

BACKGROUND OF THE INVENTION (1) Field of the Invention

The present invention relates to a hydraulic pressure unit (or a hydraulic unit).

(2) Description of Related Art

A hydraulic (pressure) unit is known in which a plurality of piping connections are installed in a housing. For example, a previously proposed hydraulic pressure unit described in a Japanese Patent Application First Publication (tokkai) No. 2002-339903 (Published on Nov. 27, 2002) includes a protective tape to be adhered onto an outer surface of the housing, suppresses a mixture (or invasion) of foreign matter into the piping connections by covering openings of the piping connections with the protective tape so as to protect the hydraulic pressure unit. Each opening can be opened or closed by peeling off the tape or adhering the tape. The protective tape can be closed or open by dividing the protective tape or peeling off the protective tape for each of the openings of the respective piping connections. In this division section, a dotted shaped cut line (a perforated line) is disposed.

SUMMARY OF THE INVENTION

However, in the previously proposed hydraulic pressure unit described above, part of the tape is left onto the housing side according to a manner of the peeling off of the protective tape and an operation to peel off the left part of the tape is tiresome and there is a possibility of a reduction in the operability.

It is, therefore, an object of the present invention to provide a hydraulic pressure unit which is capable of improving a workability (operability) of the hydraulic pressure unit.

According to one aspect of the present invention, there is provided a hydraulic pressure unit comprising: a housing equipped with a plurality of piping connections having respectively corresponding openings exposed to an external or plurally grouped piping connections; and a protective tape including one surface onto which a pressure-sensitive adhesive is disposed by means of which the tape is adhered onto an outer surface of the housing, one sheet of the tape covering simultaneously at least two of the openings or plurally grouped piping connections, the protective tape including: a division section dividing and peeling off the protective tape for each of the openings of the piping connections or for each of the groups of the piping connections; and a grip section disposed to be enabled to be gripped by an operator, wherein an adhesion region of the protective tape to the outer surface of the housing by means of the adhesive is disposed on a region excluding the division section.

According to another aspect of the present invention, there is provided a hydraulic pressure unit comprising: a housing in which a plurality of piping connections exposed to an external or plurally grouped piping connections are equipped on an outer surface of the housing; and a protective tape on one surface of which a pressure-sensitive adhesive is disposed, one sheet of the protective tape simultaneously covering at least two openings or the plurally grouped piping connections, the protecting tape having a division section to divide and peel off the protective tape for each of the openings of the piping connections or for each of the groups of the piping connections, and an adhesive region between the protective tape and the outer surface of the housing being disposed on a region except the division section.

According to a still another aspect of the present invention, there is provided a protective tape comprising: a pressure-sensitive adhesive disposed on one surface of the protective tape; and a housing having a plurality of piping connections whose openings are exposed to an external or a plurally grouped piping connections, the protective tape being adhered on an outer surface of the housing by means of the adhesive, one tape of the protective tape simultaneously covering at least two openings or the plurally grouped piping connections, the protective tape having a division section to divide and peel off the protective tape for each of the openings of the piping connections or for each of the groups of the piping connections and a grip section disposed to be enabled to be gripped by an operator, and the adhesive being disposed in a region except the division section.

DETAILED DESCRIPTION OF THE INVENTION

Reference will hereinafter be made to the drawings in order to facilitate a better understanding of the present invention. Preferred embodiments of a hydraulic pressure unit will be explained below with reference to the accompanied drawings.

First Embodiment

A unit in a first preferred embodiment is a hydraulic pressure unit for a vehicle, especially, for an automotive vehicle (hereinafter called, a hydraulic pressure unit (or a hydraulic unit) 1). Hydraulic pressure unit 1 is applied to a brake system for a four-wheel automotive vehicle. Hydraulic pressure unit 1 is a unit of a hydraulic pressure type brake control system mounted so as to enable an automatic brake control or an anti-lock brake control to be executed. Hydraulic pressure unit 1 is arranged between a master cylinder of a tandem type and a wheel cylinder of each road wheel. The brake system is of an X shape piping configuration and p system and s system brake piping are installed in the brake system. It should be noted that hydraulic pressure unit 1 is a unit of a fluidic device including a plurality of openings (piping connections) on an outer surface of the housing and the present invention is applicable to the unit for a pneumatic equipment not only for various types of hydraulic pressure devices. In addition, the unit is applicable to a unit in which electronic control devices or other devices are integrated for the fluidic devices.

Figure 1:
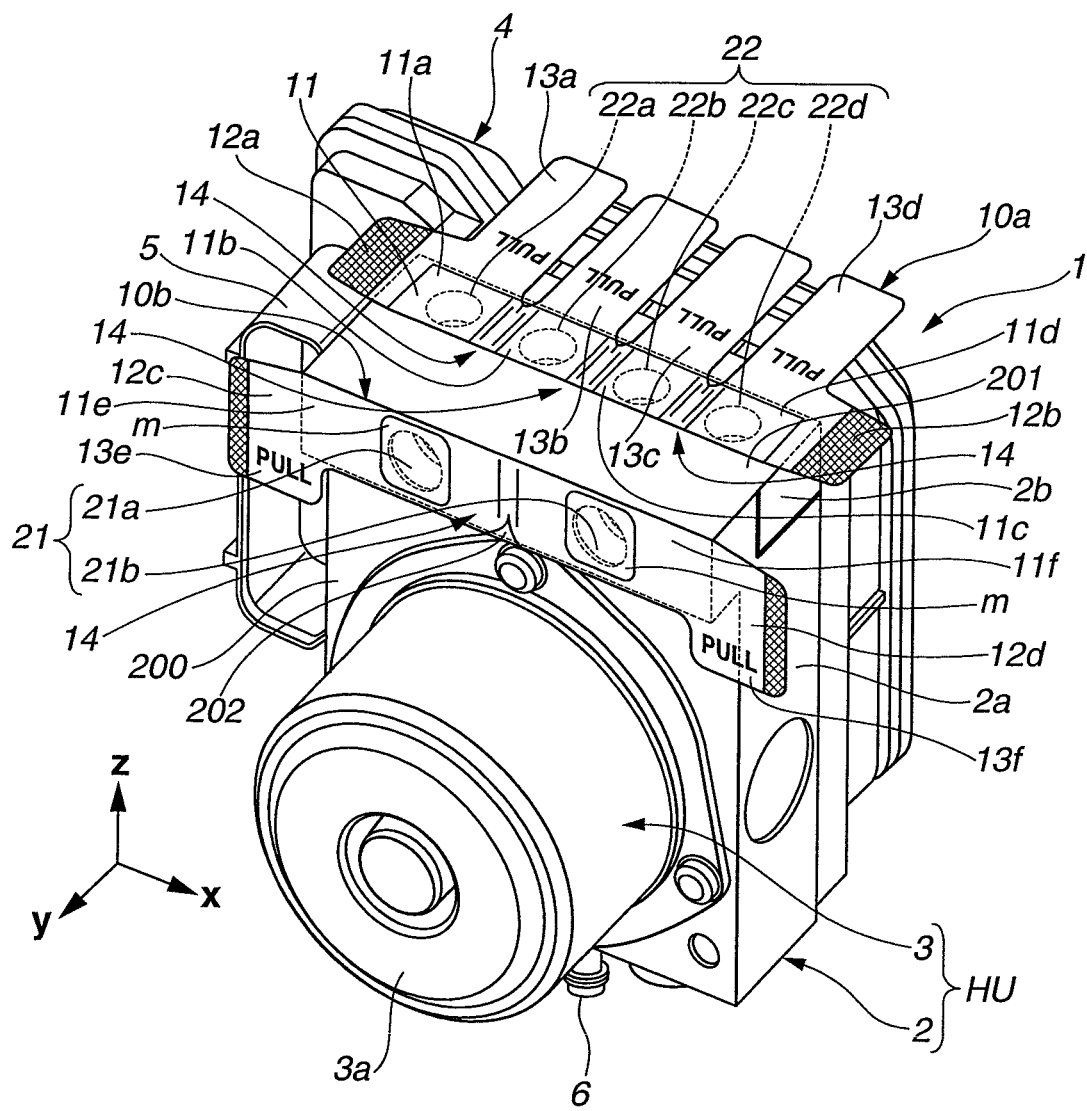
FIG. 1 is a perspective view representing a hydraulic pressure unit in a first preferred embodiment according to the present invention in a state in which a protective tape is adhered on a housing.

FIG. 1 shows hydraulic pressure unit 1 in a state in which a protective tape 10 is adhered onto a housing 2. Hydraulic pressure unit 1 is a liquid pressure control unit of a mechatronic integration type in which an electronic control unit 4 is integrally built in a liquid pressure unit HU in which a motor 3 is integrally mounted on a housing 2. An integration of liquid pressure unit HU with electronic control unit 4 reduces coupling locations such as harness or connectors to reduce a mounting space on the automotive vehicle and reduces electrical connection parts to achiever an improvement in reliability. Hereinafter, this liquid pressure control unit is merely called hydraulic pressure unit 1. Housing 2 is a block of an approximately rectangular parallel piped body and is formed by cut working an aluminum series metallic material. It should be noted that the material and working method are appropriately selectable. A hydraulic pressure passage (hydraulic pressure circuit) though which a brake liquid is circulated as a hydraulic pressure oil, a volumetric chamber such as a reservoir and so forth, and a housing chamber for housing a valve body of a pump or an electromagnetic valve (a solenoid valve) are installed within housing 2. Motor 3 is a motive power source driving the pump and is housed within a bottomed cylindrical shape motor casing 3a. Electronic control unit 4 is provided with an electronic circuit board for controlling an operation of each actuator in hydraulic pressure unit 1, for example a drive of motor 3, and an open-or-closure of the electromagnetic valve. Electronic control unit 4 includes an input section (a connector 5) to supply control purpose signals and a power supply.

Hereinafter, for explanation purpose, an orthogonal coordinate system is set in which a y axis is disposed in a direction in which a rotary axis of motor 3 is extended and a side of motor 3 with respect to electronic control unit 4 is assumed as a positive direction. A z axis is disposed in a vertical direction and an upper direction with respect to the z-axis direction is positive direction. An x-axis is disposed in a direction orthogonal to y axis and z axis (a direction in which piping connections 22a, 22b, 22c, and 22d are aligned) and a side of connector 5 on electronic control unit 4 is called a negative direction. Housing 2 includes a main body section 2a in which the above-described volume chamber and housing chamber are formed; and a port section 2b on which ports to connect a brake piping to hydraulic pressure unit 1. It should be noted that the housing chamber(s) may be formed in port section 2b. Main body section 2a is approximately parallel piped shape having a relatively small y-axis direction dimension. It should be noted that a motor casing 3a is bolt tightened onto a surface 200 at the y axis positive direction side of main body section 2a and motor 3 is integrally supported on housing 2. On surfaces at the y-axis negative direction side of housing 2, respective casings of electronic control unit 4 are attached. Electronic control unit 4 is integrally supported on housing 2. An engagement purpose supporting bolt 6 is projected from a surface of main body section 2a at the z-axis negative direction side. Using this supporting bolt 6, a hydraulic unit 1 is installed on the vehicle.

Port section 2b is integrally installed onto main body section 2a at the z-axis positive direction side of main body section 2a. Port section 2b has a smaller dimension of the z-axis directional dimension than main body section 2a and has a larger dimension of the y-axis directional dimension than main body section 2a. Then, port section 2b is approximately parallelpiped shape having a surface 202 projected slightly from a surface 200 in the y-axis positive direction side of main body section 2a. A plurality of piping connections 21, 22 which are ports to which a plurality of brake pipes are connected. The brake pipes and oil passages within housing 2 are interconnected via piping connections 21, 22. A plurality of piping connections 21a, 21b are opened to be exposaed to surface 202 of port section 2b at the y-axis positive direction side of port section 2b. Piping connections 21a, 21b are ports to connect p-system and s-system brake pipings to be connected to the master cylinder and are aligned in the x-axis direction substantially symmetrically with an axis of motor 3 sandwiched. A plurality of piping connections 22a, 22b, 22c, 22d are open to be exposed to the external of housing 2. Piping connections 22a, 22b, 22c, 22d are ports to connect the brake pipings connected to respective wheel cylinders of road wheels and aligned at substantially equal intervals on a substantially straight line in the x axis direction in a region of y axis negative direction side in surface 201. Piping connection 21a is positioned between piping connections 22a, 22b and piping connections 21b is positioned between piping connections 22c, 22d, in the x-axis direction.

Piping connections 22a, 22b correspond to a brake piping (piping connection 21a) of p-system and are connected to brake pipes, for example, connected to wheel cylinders of right front road wheels and left rear road wheels. Piping connections 22c, 22d correspond to the brake pipes (piping connection 21b) in the s-system are connected to brake pipes connected to, for example, wheel cylinders of left front road wheels and right rear road wheels. For example, at the time of ordinary braking, a brake liquid is supplied from the master cylinder to the brake piping in the p system and s system and distributed toward four wheel cylinders of four road wheels via piping connections 22a, 22b, 22c, 22d after the oil passage within hydraulic pressure unit 1 from piping connections 22a, 22b, 22c, 22d after the brake liquid is passed within hydraulic pressure unit 1 from piping connections 21a, 21b. In this way, housing 2 includes a group 21 (21a, 21b) of the connections of the brake pipes connected to the master cylinder and a group 22 (22a, 22b, 22c, 22d) of the piping connections of the brake pipes to be connected to the wheel cylinders. The plurality of piping connections (in the first embodiment, six) are grouped plurally (two (groups) in the first embodiment). It should be noted that the number and arrangement of the piping connections disposed on the outer surface of housing 2 are not limited to those described in the first embodiment. For example, the brake piping configuration may be forward-or-backward piping configuration (not limited to X shape piping configuration). In addition, piping connections 21 (21a, 21b) to be connected to the master cylinder may be arranged to be open to same surface 201 as piping connections 22 (22a, 22b, 22c, 22d) to be connected to the wheel cylinder. In addition, when the plurality of piping connections are grouped, the piping connections are not classified according to the object to be connected but may be classified according to whether they are included in the same region in a case where the regions are divided symmetrically with a certain reference position as a boundary or according to whether the procedures of the piping connection operation is near to each other. However, a specific limitation is not placed. In the first embodiment, piping connections 22 (22a, 22b, 22c, 22d) to be connected to the wheel cylinders are a single group. However, this single group may be divided into two to form the two groups.

Protective tape 10 is a tape to protect hydraulic pressure unit 1 from an invasion of foreign matter into this unit 1 and is adhered onto an outer surface of housing 2. Protective tape 10 is a kind of seal to cover openings of the plurality of piping connections 21, 22 in housing 2. Protective tape 10 includes: a transparent sheet-like tape main body 100; and a pressure-sensitive adhesive layer (or simply, an adhesive layer) 101 coated on one surface of tape main body 10. Protective tape 10 is in a state in which tape 10 is adhered to a pasteboard before a state in which tape 10 is adhered to housing 2. A release layer (or a stripping layer) (of the pasteboard) is overlapped over adhesive layer 101 of protective tape 10. As a material of protective tape 10, various types of resins, for example, polyethylene, polypropylene, polyethylene terephthalate, and so forth can be applied. With a transparency, cost, and reusability taken into consideration, polyethylene is advantageous. In addition, as adhesive layer 101, a well-known adhesive material with a rubber-like, acrylic polymer, or silicon series polymer as a base. Protective tape 10 includes first tape 10a and second tape 10b. One sheet of first tape 10a is disposed on a single hydraulic pressure unit 1, is adhered to outer surface 201 located at a vertical upper part of housing 2 (port section 2b). One sheet of first tape 10a simultaneously covers and seals at least two piping connections (all of four connections 22a, 22b, 22c, 22d in the first embodiment). It should be noted that, in a case where piping connections 22a, 22b, 22c, 22d are grouped in plural form, first tape 10a simultaneously covers and seals the opening of each group of the piping connections (for example, the group of connections 22a, 22b and the group of connections 22c, 22d).

(First Tape)

Figure 2:
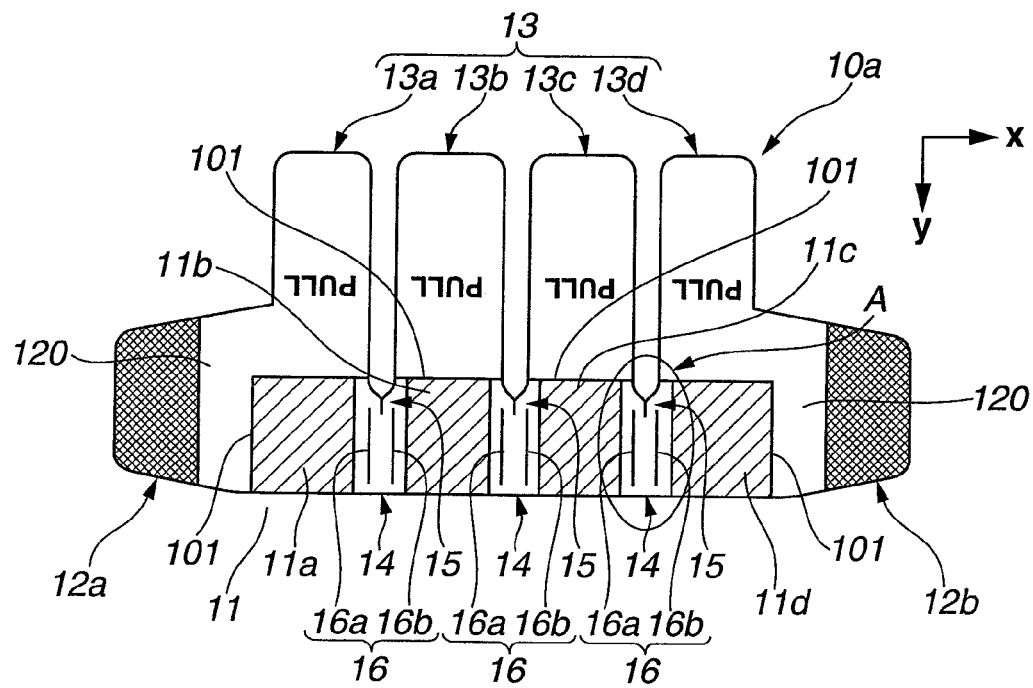
FIG. 2 is a plan view of a first tape in the first preferred embodiment shown in FIG. 1.

FIG. 2 shows a plan view of first tape 10a. Adhesive layer 101 is disposed on at least one part of first tape 10a. First tape 10a includes: a main body section 11 which covers openings of piping connections 22a, 22b, 22c, 22d; grip sections 12, 13 connected to main body section 11, at least one part of which no adhesive layer 101 is disposed, and to be gripped by the operator; and division section 14 to divide and peel off first tape 10a for each of the openings of piping connections 22a, 22b, 22c, 22d or for each of the groups of piping connections 22a, 22b, 22c, 22d.

Main body section 11 includes a plurality of seal sections 11a, 11b, 11c, 11d (in this embodiment, four), each seal section being arranged in a shape to be enabled to cover the corresponding one of openings of piping connections 22a, 22b, 22c, 22d in a state in which first table 10a is adhered onto outer surface 201 of housing 2. Each of seal sections 11a, 11b, 11c, 11d is linked to one another by means of division section 14.

As shown in oblique lines in FIG. 2, adhesive layer 101 is disposed on a whole region of seal sections 11a, 11b, 11c, 11d. Seal sections 11a, 11b, 11c, 11d are disposed to enable sealing on an inside and an outside of piping connections 22a, 22b, 22c, 22d by tightly adhering adhesive layer 101 on outer surface 201 of a surrounding of each of openings of piping connections 22a, 22b, 22c, 22d. Specifically, each of seal sections 11a, 11b, 11c, 11d is rectangular and a length of each seal section (the size of the x-axis direction) and a width thereof (the size of the y-axis direction) are set to be larger than diameter of the corresponding one of piping connections 22a, 22b, 22c, 22d. It should be noted that the region of seal regions 11a, 11b, 11c, 11d in which adhesive layer 101 is disposed is not always the whole region of seal regions 11a, 11b, 11c, 11d since, if the region is a region in which the surrounding of the openings of piping connections 22a, 22b, 22c, 22d, this region can cover and seal at least the openings described above. Division sections 14 (division section 14) are integrally disposed between adjacent seal sections 11a, 11b, between adjacent seal sections 11b, 11c, and between adjacent seal sections 11c, 11d. Adhesive layer 101 is not disposed on the whole region of each division section 14. A length in the x-axis direction of each division section 14 is a few percent of the length of x-axis direction of each seal section 11a, 11b, 11c, 11d. The y-axis direction width of each division section 14 is the same as the y-axis direction width of each seal section 11a, 11b, 11c, 11d except a part in which cut section 15 is disposed as will be described later. Each division section 14 has a structure (cut section 15 and slit section 16 as will be described later) to divide and peel off main body section 11 (for each of seal sections 11a, 11b, 11c, 11d) at a position between the openings of mutually adjacent piping connections 22a, 22b, 22c, 22d (in a state in which first tape 10a is adhered at an appropriate position of housing 2).

The grip section is arranged at a surrounding edge position of protective tape 10 and is projected from main body section 11. The grip section includes an adhering purpose grip section 12 and a peel off purpose grip section 13. Adhering purpose grip section 12 includes: an adhering purpose grip section 12a disposed at the x-axis negative direction end of main body section 11; and adhering purpose grip section 12b disposed at the x-axis positive direction end of main body section 11. Adhesive layer 101 is not disposed on the whole region of adhering purpose grip sections 12a, 12b. Adhering purpose grip sections 12a, 12b are gripped by the operator when first tape 10a is peeled off from its pasteboard and when first tape 10a is adhered onto housing 2. Thus, these operations are facilitated. Adhering purpose grip sections 12a, 12b are disposed to be projected toward the x-axis direction from housing 2 in a state in which first tape 10a is adhered onto an appropriate location of housing 2. Hence, the peeling off operation becomes easy.

Adhering purpose grip section 12a is disposed in a substantially trapezoidal shape such as to be extended toward the x-axis negative direction side from the edge of the x-axis negative direction side of one seal section 11a and its y-axis direction width becomes gradually narrowed. The y-axis negative direction width of adhering purpose grip section 12a is larger than the y-axis direction width of main body section 11 and is wide. A portion 120 at y-axis direction negative direction side of adhering purpose grip section 12a is extended more toward y-axis negative direction side than y-axis negative direction end of main body section 11 (seal section 11a) and has its x-axis positive direction side integrally connected to a root section of peel off purpose grip section 13a as will be described later. It should be noted that other adhering purpose grip section 12b has the same shape as one adhering purpose grip section 12a. It should also be noted that the shape of adhering purpose grip section 12 is arbitrary. In addition, adhering purpose grip section 12 may be eliminated. In this case, it is possible to grip peel off purpose grip section 13 to perform the above-described operation. In this embodiment, since adhering purpose grip section 12 is additionally disposed, the above-described operation can more smoothly be carried out.

Four of peel off purpose grip section 13 are disposed on y-axis negative direction side of main body section 11 and peel off purpose grip sections 13a, 13b, 13c, 13d are arrayed in this order from the x-axis negative direction side toward the x-axis positive direction side. Peel off purpose grip sections 13a, 13b, 13c, 13d are disposed to correspond to seal sections 11a, 11b, 11c, 11d, respectively, and are connected to seal sections 11a, 11b, 11c, 11d at the y-axis positive direction side. Adhesive layer 101 is not disposed on the whole region of peel off purpose grip section 13. Peel off purpose grip sections 13a, 13b, 13c, 13d are respectively gripped by the operator to facilitate the peel off operation when main body section 11 is divided and peeled off from housing 2 (for each of seal sections 11a, 11b, 11c, 11d). Peel off purpose grip sections 13a, 13b, 13c, 13d are disposed to be projected from housing 2 (outer surface 201) in the y-axis negative direction. Hence, the peeling off operation can be facilitated. The x-axis direction width of each peeling off purpose grip section 13a, 13b, 13c, 13d is set to be slightly larger than the x-axis direction width of corresponding seal sections 11a, 11b, 11c, 11d. One of peeling off purpose grip sections 13a is disposed such that the x-axis direction width is left at substantially constant and disposed in a substantially rectangular shape which extends from the side of y-axis negative direction side toward the y-axis negative direction side. Each of other peel off purpose grip sections 13b, 13c, 13d has the similar shape. The length of peel off purpose grip sections 13a, 13b, 13c, 13d in the y-axis direction has a magnitude such that the operator is easy to grip and to peel off and is preferably not spatially disturbed. In a case where the z-axis direction gap between outer surface 201 of housing 2 (namely, peel off purpose grip sections 13a, 13b 13c, 13d extended toward the side of electronic control unit 4 at the z-axis direction position of outer surface 201) and the z-axis positive direction end section of electronic control unit 4 is small (to a degree such that an operator's finger is not entered), it is advantageous if each of peel off purpose grip sections 13a, 13b, 13c, 13d is the y-axis direction length extended to the more outside than electronic control unit 4.

A letter of "PULL" ("hipparu" in Japanese) is displayed on each of peel off purpose grip sections 13a, 13b, 13c, 13d, (refer to FIG. 1) to tell the operator to grip and peel off the corresponding one of the peel off purpose grip sections 13a, 13b, 13c, 13d. In addition, since the letter of "PULL" is inscribed so as to be enabled to be read as viewed from a front side of first tape 10a, front and rear sides of first tape 10a can easily be discriminated. It should be noted that various pictorial types of information, for example, an arrow mark or a triangle indicating the peeling off direction by the operator, and/or other notations upon the operation may be described on grip section 13 (each of peeling off purpose grip sections 13a, 13b, 13c, 13d). In addition, in the tip section of each grip section 12, 13, a semi-transparent or opaque solid filling region may be disposed to tell the operator that this is a grip portion (or for each grip section 12, 13 to be gripped). The various inscriptions on first tape 10a can be performed by printing on either of front or rear surface of first tape 10a. In the first embodiment, since the tape main body is transparent, portions of the respective inscriptions are set to be semi-transparent or opaque. On the contrary, the portions of the respective inscriptions may be set to be transparent and the surrounding portions of the respective inscriptions may be set to be semi-transparent or opaque. In this case, it is also preferable to set seal sections 11a, 11b, 11c, 11d to be transparent.

As described above, portion 120 at the y-axis negative direction side of peeling off purpose grip section 12a is extended more toward the y-axis negative direction side than main body section 11 (seal section 11a) and integrally continued at a root section of peel off purpose grip section 13a (to divide and to peel off seal section 11a) at the x-axis positive direction side of main body section 11. Above-described portion 120 of adhering purpose grip section 12a is disposed to be projected in the x-axis negative direction and in the y-axis negative direction from housing 2 (outer surface 201) in a state in which first tape 10a is adhered onto an appropriate location of housing 2. Above-described portion 120 of adhering purpose grip section 12a is not only enabled to be gripped when first tape 10a is adhered onto housing 2 but also is gripped when seal section 11a is divided and peeled off from housing 2. Thus, the peeling off operation is facilitated. That is to say, when seal section 11a is divided and peeled off, either of peel off purpose grip section 13a or portion 120 of adhering purpose grip section 12a may be gripped and peeled off. Above-described portion 120 has both functions of the peel off purpose grip section and the adhering purpose grip section.

Figure 3:
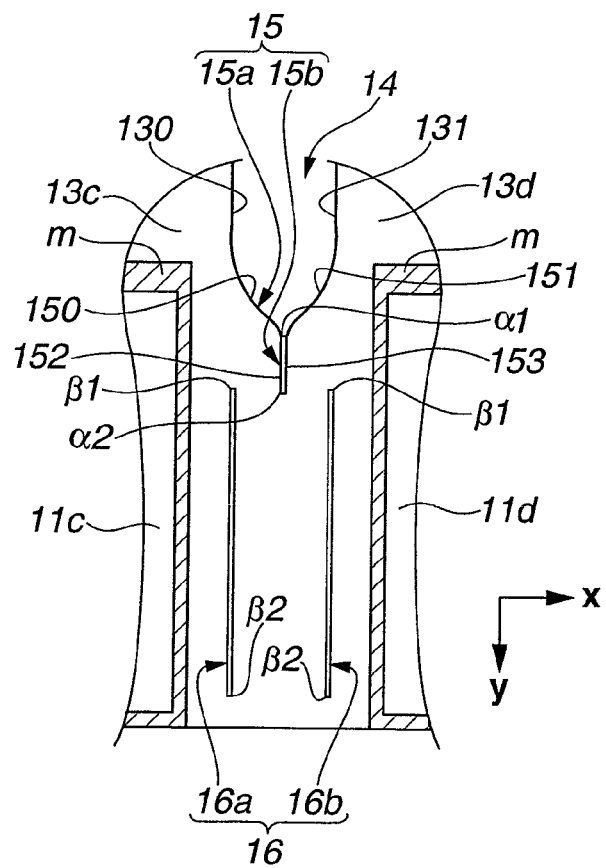
FIG. 3 is an expanded view of a part A in FIG. 2 representing a division section of the first tape in the first embodiment shown in FIG. 1.

FIG. 3 shows an expanded view of portion A in FIG. 2 and represents one division section 14 of first tape 10a. Division section 14 has a structure such as to enable a division of main body section 11 and perform a selective peeling off for each of sealing sections 11a, 11b, 11c, 11d (an arrangement structure of cut or slit) and includes a cut section 15 and a slit section 16.

Cut section 15 is a cut section formed from a side of division section 14 at the negative direction side of y-axis toward the positive direction side of y-axis and cut to a predetermined y-axis direction position of division section. Specifically, cut section 15 is formed to be open to a y-axis negative direction side end. Cut section 15 is formed to be opened toward y-axis negative direction side. Cut section 15 includes recess section 15a as a first cut section and a first slit 15b as a second cut section. It should be noted that the term of slit used in the present specification means an elongated gap or break. Recess section 15a is continued with a connection position with a corresponding one of peel off purpose grip section 13 (13a, 13b, 13c, 13d) in each of division section 14 and is formed to cut division section 14 in a substantially rectangular shape from peel off purpose grip section 13 (y-axis negative direction side). Recess section 15a includes an edge 150 continued to a side 130 of one peel off purpose grip section 13c in the x-axis positive direction side thereof and an edge 151 continued to a side 131 of other peel off purpose grip section 13d adjacent to this peel off purpose grip section 13c in the x-axis negative direction side thereof. Edge 150 is formed in a substantially straight line such as to be extended obliquely from the connection position with peel off purpose grip section 13c in division section 14 toward the y-axis positive direction side and a substantially center section of the x-axis direction of division section 14. Similarly, edge 151 is formed in the substantially straight line such as to be extended obliquely from the connection position with peel off purpose grip section 13d in division section 14 toward the y-axis positive direction side and a substantially center section of the x-axis direction of division section 14.

Their respective connection sections of edges 150, 151 with sides 130, 131 of peel off purpose grip section 13 are formed in smooth curved shapes. That to say, peel off purpose grip section 13 is disposed to be smoothly continued to recess section 15a. Edges 150, 151 are joined at a substantially center in the x-axis direction of division section 14. An angle formed between both edges 150, 151 is set such as to be slightly smaller than a right angle.

A first slit 15b is formed at the substantially center in the x-axis positive direction of division section 14 which cuts from a joint of both edges 150, 151 toward the y-axis positive direction and is extended in the substantially straight line. First slit 15b is opened to recess section 15a at the y-axis negative direction side. An edge 152 at the x-axis negative direction side of first slit 15b is continued to edge 150 of recess section 15a and an edge 153 at the x-axis positive direction side of first slit 15b is continued to edge 151 of recess section 15a. In other words, cut section 15 is formed in such a way that edges 150, 151 extended obliquely from the connection portions with peel off purpose grip section 13 in division section 14 and edges 152, 153 extended in substantially parallel to sides 130, 131 of peel off purpose grip section 13 are substantially symmetrical to each other with respect to a substantial center line in the x-axis direction of division section 14. The length in the y-axis direction of first slit 15b is set to be the substantially same as a depth of recess section in the y-axis direction or larger than that. The length of y-axis direction of cut section 15 (recess section 15a and first slit section 15b) is set to be ¼ or more than the dimension in the y-axis direction of division section 14.

Slit section 16 is formed by cutting sides 130, 131 of peel off purpose grip section 13 (namely, a space between each of adjoining seal sections 11a, 11b, 11c, 11d) in the substantially straight line on a line extended toward the y-axis positive direction side. Slit section 16 includes a second slit 16a and a third slit 16b, as respectively single breaks, at left and right positions of first slit 15b, specifically, at substantially symmetrical positions in the x-axis direction of division section 14 with substantially center line of x-axis direction of division section 14 sandwiched. Second slit 16a is formed in such a way that side 130 of peel off purpose grip section 13 is extended in the y-axis direction on a line extended toward the y-axis positive direction side (the x-axis positive direction side of mark m enclosing seal section 11c) and its axial line is disposed on a position offset by a predetermined distance from the axial line of cut section (first slit section 15b) toward the x-axis negative direction side (approximately half of the x-axis direction distance between sides 130, 131 of adjacent peel off purpose grip section 13). Third slit 16b is formed in such a way that side 131 of peel off purpose grip section 13 is extended in the y-axis direction on a line extended toward the y-axis positive direction side (the x-axis positive direction side of mark m enclosing seal section 11c) and its axial line is disposed on a position offset by a predetermined distance from the axial line of cut section (first slit section 15b) toward the x-axis positive direction side (approximately half of the x-axis direction distance between sides 130, 131 of adjacent peel off purpose grip section 13). Second slit 16a and third slit 16b are not open to the y-axis positive direction side of division section 14 nor the y-axis direction negative direction side of division section 14. The length in the y-axis direction of each of second slit 16a, 16b is set to be about 70% of the y-axis direction size of division section 14. A y-axis positive direction end β2 of each of second and third slits 16a, 16b is disposed at substantially the same position separated from a side of the y-axis positive direction side of division section 14 toward the y-axis negative direction side by a predetermined distance. A y-axis negative direction end β1 of each of second and third slits 16a, 16b is disposed at the substantially same y-axis direction position as a y-axis positive direction end α2 of first slit 15b. These ends α2 and β1 are substantially overlapped as viewed from the x-axis direction. First slit 15b (namely, a y-axis direction end α1 of first slit 15b) is formed at the y-axis negative direction side than second and third slits 16a, 16b (a y-axis negative direction end β1), namely, at a position nearer to peel off purpose grip section 13.

(Second Tape)

Figure 4:
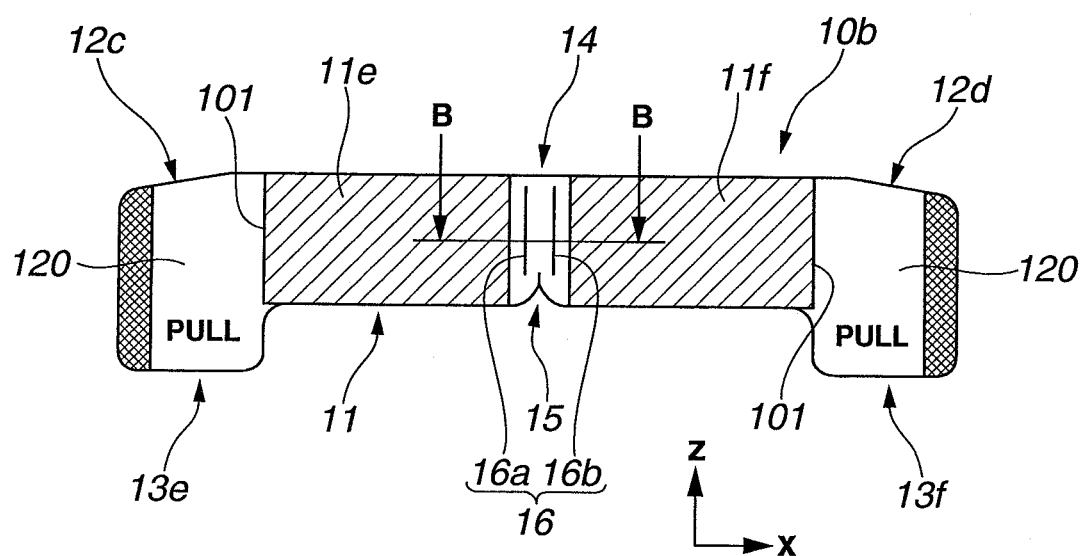
FIG. 4 is a plan view of a second tape in the first embodiment shown in FIG. 1.

FIG. 4 shows a plan view of second tape 10b. It should be noted that the like structures corresponding to first tape 10a designate the same reference numerals and their explanations are omitted herein. Second tape 10b has at least one part onto which adhesive layer 101 is disposed and adhesive layer 101 is adhered to outer surface 202 of housing 2. Second tape 10b includes: main body section 11 covering the openings of piping connections 21a, 21b; grip sections 12, 13 disposed on main body section 11 without installation of adhesive layer 101 on at least one part and disposed to enable for the operator to grip; and a division section 14 to divide and peel off main body section 11 for opening of piping connections 21a, 21b.

Main body section 11 includes: a plurality of seal sections 11e, 11f (two in this embodiment) disposed so as to enable covering respective openings of piping connections 21a, 21b in outer surface 202. Mutual seal sections 11e, 11f are linked to division section 14.

As denoted by oblique lines in FIG. 4, adhesive layer 101 is adhered onto the whole region of seal sections 11e, 11f and are tightly contacted on outer surfaces 202 of the opening surroundings of piping connections 21a, 21b so as to enable the sealing of the inner and outer sides of piping connections 21a, 21b. Specifically, each seal section 11e, 11f is rectangular and is set such that its length (dimension in the x-axis direction) and its width (dimension in the y-axis direction) of each seal section 11e, 11f are larger than diameter of piping connections 21a, 21b. It should be noted that, if the region in which adhesive layer 101 is disposed on the seal sections 11e, 11f is the region in which the surrounding of the opening of piping connections 21a, 21b can cover, the region can cover and seal at least the openings of the piping connections. Hence, adhesive layer 101 is not always necessary to be disposed on the whole region of seal sections 11e, 11f. Division section 14 is integrally disposed with seal sections 11e, 11f between seal sections 11a, 11f. Adhesive layer 101 is not installed on the whole region of division section 14. The detailed structure of division section 14 is the same as that in the case of first tape 10a (refer to FIG. 3). Hence, the detailed explanation thereof will herein be omitted. It should be noted that, in second tape 10b, no peel off purpose grip section 13 is disposed on a side surface of the elongation direction of the tape and second tape 10b is different from first tape 10a only in that edges 150, 151 of recess section 15a are disposed so as to be continued smoothly in the z-axis negative direction side surface of main body section 11.

The grip section is disposed to be projected from both ends of elongated direction of the tape and is provided with adhering purpose grip section 12 and peel off purpose grip section 13. Adhering purpose grip section 12 includes: an adhering purpose grip section 12c disposed at an x-axis positive direction end of main body section 11; and an adhering purpose grip section 12d disposed at an x-axis positive direction end of main body section 11. It should be noted that adhesive layer 101 is not disposed on the whole region of adhering purpose grip sections 12c, 12d. Adhering purpose grip sections 12c, 12d are gripped by the operator when second tape 10b is peeled off from the pasteboard and when second tape 10b is approximately adhered onto housing 2. Thus, these operations can be facilitated. Since adhering purpose grip sections 12c, 12d are projected from housing 2 in the x-axis direction in a state in which second tape 10b is adhered onto an appropriate position of housing 2, these operations can be facilitated. Adhering purpose grip section 12c is formed such as to be extended from the edge of the x-axis negative direction side of seal section 11e toward the x-axis negative direction side and is gradually deviated toward the z-axis negative direction side as adhering purpose grip section 12c advances toward the x-axis negative direction side. The z-axis direction width of adhering purpose grip section 12c is set to be larger than the z-axis direction width of main body section 11 and to be wide. Portion 120 of adhering purpose grip section 12c in the z-axis negative direction side is extended toward the more z-axis negative direction than the z-axis negative direction end of main body section 11 (seal section 11e). This portion projected toward the z-axis negative direction side is connected to seal section 11e via the remaining part of adhering purpose grip section 12c to constitute peel off purpose grip section 13e of seal section 11e. Adhering purpose grip section 12d has the same shape as adhering purpose grip section 12c.

The z-axis negative direction side portion 120 of adhering purpose grip section 12d constitutes peel off purpose grip section 13f of seal section 11f. Peel off purpose grip sections 13e, 13f are gripped by the operator when second tape 10b is divided and peel off from housing 2 (for each of seal sections 11e, 11f) to facilitate these operations. Since peel off purpose grip sections 13e, 13f are projected from port section 2b (outer surface 202) toward the z-axis negative direction in a state in which second tape 10b is adhered to an appropriate position of housing 2, the peel off operation becomes facilitated.

It should be noted that, unless disturbing the grip of the operator, adhesive layer 101 may partially be disposed within grip sections 12, 13. The region enclosing each seal section 11a, 11b, 11c, 11d, 11e, 11f for first tape 10a and second tape 10b is filled semi-transparently or opaquely in a circular shape or in a square shape and mark may be disposed (refer to mark m in FIGS. 1 and 4). These marks m display the correspondence of respective seal sections 11a, 11b, 11c, 11d, 11f to the respective openings of piping connections 22a, 22b, 22c, 22d, 21a, 21b. By telling pictorially the operator to adhering main body section 11 so as to position the respective openings of piping connections 22a, 22b, 22c, 22d, 21a, 21b within this mark m, the adhering operation by the operator can be facilitated. In this case, since sealing sections 11a, 11b, 11c, 11d of respective tapes 10a, 10b are transparent, it becomes easy for the operator to position each seal section 11a, 11b, 11c, 11d, 11f for each opening of piping connections 22a, 22b, 22c, 22d, 21a, 21b (by visually recognizing piping connections 22a, 22b, 22c, 22d, 21a, 21b via respective sealing sections 11a, 11b, 11c, 11d, 11e, 11f). In addition, these marks m respectively display regions (seal section 11a, 11b, 11c, 11d, 11e, 11f) which are division units when main body section 11 is peeled off from outer surfaces 201, 202. The operator can easily confirm whether main body section 11 is accurately divided and peeled off with these marks as signs (namely, actual breaks are deviated from division section 14 and reach within seal sections 11a, 11b, 11c, 11d, 11e, 11f). Such a notation that "REMOVE BEFORE ASSEMBLY" within the region enclosed with mark m is described on the tape so that the attention should be given to the operator. In addition, first tape 10a may be divided into two and may be formed as one sheet of tape 10. In this case, the openings of respective groups of the piping connections (the group of connections 21a, 21b and the group of connections 22a, 22b, 22c, 22d) simultaneously cover and are sealed. In this case, protective tape 10 is formed as the shape to enable the covering of the region from outer surface 201 to outer surface 202 in housing 2 and protective tape 10 is adhered so as to be folded at a boundary region between both surfaces 201, 202, namely, at an edge portion over which both surfaces 201, 202 cross.

Action of First Embodiment

Hereinafter, an action of hydraulic pressure unit 1 will be described.
(Action of Protective Tape)
In general, many fluidic devices are unitized and a plurality of piping connections to perform the piping connections are disposed. In such a fluidic device as described above, the openings of the respective piping connections are exposed to the external. Hence, it is necessary to suppress an invasion of foreign matter from the external into an inside of the piping connections by covering temporarily (during a time duration of a storage or carriage of the hydraulic pressure unit and during the time duration until the other operations of the piping connections are ended after the unit assembly) the openings of these piping connections. For example, the hydraulic pressure unit for the vehicle (namely, to be mounted in the automotive vehicle or to be assembled into the automotive vehicle) is a single independent product until it is mounted in the automotive vehicle and it is necessary for the piping connections to be covered and protected in some situation until the piping connections operation at the time of assembly are carried out. Especially, in a case of brake equipment, a high necessity of suppressing the invasion of foreign matter is raised. It should be noted that, as the method of covering and protecting the piping connections, a lid is put on the individual piping connections using a stopcock (screwed type or inlay type). In this case, attachment and detachment operations to attach the stopcocks and detach the stopcocks are troublesome and require long time operations. In addition, such a problem that a cost increase of the brake control system and the vehicle is introduced. In addition, a cost increase cannot be avoided in a case where a plurality of stopcocks are integrated by linkage means and these stopcocks are integrally detached from the plurality of piping connections.

On the contrary, in the case of the first embodiment, protective tape 10 (first tape 10a and second tape 10b) is adhered onto outer surfaces 201, 202 of housing 2 and simultaneously covers at least two openings of the plurality of piping connections 22a, 22b, 22c, 22d, 21a, 21b with the single tape (first tape 10a and second tape 10b). As compared with a case where the openings of the piping connections 22a, 22b, 22c, 22d, 21a, 21b are exclusively protected with the stopcocks, the openings can be closed or opened by adhering or peeling off protective tape 10. Hence, their operations are easy. In addition, a single tape can simultaneously protect the plurality of openings. Thus, protective tape 10 (main body section 11 of first tape 10a and second tape 10b) is transparent. Hence, the positioning of each tape at outer surfaces 201, 202 of housing 2 is easy and advantageous when various types of notations are disposed on the tape. It should be noted that, in a case where the adhering position of the tape can be identified in accordance with the profile of the tape (main body section 11), the tape (main body section 11) may be semi-transparent or may be opaque.

(Action According to the Disposition of the Division Section)
In the first embodiment, division section 14 is disposed to divide and peel off protective tape 10 for the openings of the piping connections 22a, 22b, 22c, 22d, 21a, 21b and/or for the groups of piping connections 22a, 22b, 22c, 22d, 21a, 21b. Division section 14 includes a process part (cut section) such as to enable to cut individually each seal section 11a, 11b, 11c, 11d, 11e, 11f along the division section. Division section 14 is arranged for each of piping connections 22a, 22b, 22c, 22d, 22d, 21a, 21b, specifically for linkage sections of respective sealing sections 11a, 11b, 11c, 11d, 11e, 11f to be adhered to correspond to each of piping connections 22a, 22b, 22c, 22d, 21a, 21b. Thus, adhered protective tape 10 (first tape 10a or second tape 10b) can be divided and peeled off for respective parts corresponding to the openings of respective piping connections 22a, 22b, 22c, 22d, 21a, 21b. Hence, the plurality of piping connections 22a, 22b, 22c, 22d, 21a, 21b which are temporarily closed can individually be opened or opened for the respective groups. If such a division section as described above is present, the tape region of a part corresponding to the opening of the piping connections (seal section 11a, 11b, 11c, 11d, 11e, 11f) can be peeled off sequentially. During the peeling off of the part, the other tape region (seal sections 11a, 11b, 11c, 11d, 11e, 11f) can selectively be closed. Thus, any of the openings that the piping connections are not ended can be protected at a time immediately before the piping connections. Hence, more accurate suppression of the invasion of foreign matter can be achieved.

(Action According to the Structure of Division Section)

In the tape division structure of a previously proposed hydraulic pressure unit, dotted lines (perforated lines) are disposed at positions to be divided. Therefore, when the tape is pulled from an oblique direction with respect to each of these dotted lines, a generated break is deviated from the cut line (dotted line) and advances to the other position so that an unintended portion of tape (the opening sections of the piping connections to be left closed) is often peeled off. Thus, there is a possibility that the seal function that the tape naturally has is deteriorated. In addition, since the tape is deviated from the cut line (the dotted line) and is broken, a portion of the tape which is an unintentional position (a portion to be removed from the tape) and left to be adhered to the outer surface of the housing is separated independently from the corresponding peel off purpose grip section (corresponds to peel off purpose grip section 13 in the first embodiment). Hence, it is often necessary to add the operation such that the left tape portion is peeled off, apart from a normal operation that the tape is peeled off using a peeling off portion. From these facts, attention needs to be paid to a directionality when the tape is peeled off, in the tape division structure of the previously proposed hydraulic pressure unit. Thus, an operability at the time of peeling off the tape becomes worsened. In addition, in the tape division structure of the previously proposed hydraulic pressure unit, the cut line (dotted line) is not disposed in the straight line shape. Hence, a degree of freedom in the cut shape of the tape is low. It should be noted that, as a raw material of the tape, the raw material having an anisotropy may be thought to be used in a sense that the break is easy to generate the break only in a particular direction. However, even if such a raw material as described above is used, there is still left in possibility that, if the tape is pulled from the oblique direction with respect to a predetermined division direction (cut line) when the tape is peeled off, the break is generated at a position offset from the division position (the opening sections of the piping connections to be left closed) and these may cause the cost increase. On the contrary, in the first embodiment, while the cost increase is suppressed using an ordinarily used raw material (low cost) having no anisotropy as the raw material of the tape, cut section 15 and slit section 16 are disposed within division section 14. Thus, the degree of freedom in the cut shape and the operability at the time of the peeling off of the tape can be improved. Hereinafter, these advantages of the first embodiment will specifically be explained.

First, an action of cut section 15 will be explained below. A direction in which the operator grips peel off purpose grip section 13 and pulls this grip section to peel off main body section 11 (each seal section 11a, 11b, 11c, 11d, 11e, 11f) is set (scheduled) to be directed from the above-described disposition of peel off purpose grip section 13 in protective tape 10 in the y-axis positive direction in the case of first tape 10a and, the z-axis positive direction in the case of second tape 10b. Cut section 15 is a part of tape (break or slit) from a side of peel off purpose grip section 13 in division section 14 (toward y-axis negative direction in the case of first tape 10a and z-axis negative direction in the case of second tape 10b). The break is started from first slit 15b of cut section 15 when the operator grips peel off purpose grip section 13 and pulls this grip section to peel off main body section 11. It should be noted that slit section 16 disposed on both sides of first slit 15b is disposed at a position more remote from peel off purpose grip section 13 than cut section 15. In other words, cut section 15 (first slit 15b) is formed at a position nearer to peel off purpose grip section 13 than cut section 16 (a position nearer to peel off purpose grip section 13). It should, herein, be noted that a phrase such that remote from or near to peel off purpose grip section 13 means that it is remote from or near to something when the operator grips peel off purpose grip section 13 and views along the direction (in y-axis negative direction in the case of first tape 10a and in the z-axis negative direction in the case of second tape 10b) in which the operator peels off main body section (each seal section 11a, 11b, 11c, 11d, 11f). Hence, when, in division section 14, the break is formed from the side of peel off purpose grip section 13, the break is formed from the side of cut section 15 (first slit 15b) (formed nearer to peel off purpose grip section 13 than slit 15) to the y-axis positive direction end α2 of first slit 15b. it should be noted that, since first slit 15b is cut at the substantially x-axis direction center position between adjoining seal sections 11a, 11b, 11c, 11d, 11e, 11f (division section 14), the break is formed at the substantially x-axis direction center position and along an extension line of first slit 15b.

It should be noted that a fourth slit may be disposed which extends on an axial line (an extension line of first slit 15b) of cut section 15 at an opposite side (a side at the y-axis positive direction in the case of first tape 10a and a side at the z-axis positive direction side in the case of second tape 10b) to a side at which cut section 15 (first slit 15b) is disposed, in division section 14. In a case where the peel off direction of main body section 11 by the operator is substantially coincident with the axial line of cut section (first slit 15b), the break generated from first slit 15b is linked with the fourth slit so that main body section 11 is easy to be broken along the axial line of cut section 15. Thus, the workability can be improved. The fourth slit may be a plurality of cuts (perforated lines) or may be a single cut. In addition, with recess section 15a omitted, first slit 15b may directly be cut from the side of peel off purpose grip section 13 in division section 14. In this embodiment, recess section 15a is disposed so that a part lifted with peel off purpose grip section 13 is smoothly continued to first slit 15b. Thus, the part lifted with peel off purpose grip section 13 cannot be cut from the position deviated from first slit 15b but can more accurately be cut from first slit (a terminal section α1). In this way, recess section 15a has a function to guide in such a way that the break is started from first slit 15b even if peel off purpose grip section 13 and first slit 15b are separated mutually in the x-axis direction.

In addition, in the first embodiment, in second tape 10b, peel off purpose grip section 13 and adhering purpose grip section 12 are integrated. However, peel off purpose grip section 13 may be disposed on the side of the z-axis negative direction of main body section 11 (each seal section 11e, 11f). In this case, since the part lifted first with peel off purpose grip section 13 is placed at the position near to first slit 15b, the start of the break from first slit 15b as described above can easily be promoted. In this embodiment, in second tape 10b adhered onto outer surface 202 of port section 2b as described above, peel off purpose grip section 13 is disposed so as to be avoided from the sides of the z-axis negative direction of seal sections 11e, 11f. Thus, an interference between peel off purpose grip section 13 (disposed at the z-axis negative direction side of outer surface 202) and motor casing 3a can be avoided. This can make the peeling off operation efficient. In addition, since peel off purpose grip section 13 is integrated with adhering purpose grip section 12 so that the structure of second tape 10b can be simplified.

Next, an action of slit section 16 will be described below. The axial line of cut section 15 and the axial line of slit section 16 (second and third slits 16a, 16b) which is the cut section formed apart from cut section 15 are offset from each other.

Thus, when the operator grips peel off purpose grip section 13 to peel off main body section 11, it becomes easy to peel off main body section 11 along division section 14, even if the peel off direction is not constant, since the break is suppressed to be deviated from the whole of division section 14. It should be noted that the "axial line" of the cut section or the slit is assumed to be the straight line along the direction in which the cut section or the slit is extended as viewed from a plane of protective tape 10 and can be assumed as being enabled to be approximated to a tangential line at an arbitrary point (for example, end α2 of first slit 15b). Second tape 10b is exemplified as follows: The axial line of either second slit 16a or third slit 16b is offset to the x-axis direction with respect to the axial line of first slit 15b by the predetermined distance. Thus, in a case where the peeling off direction of main body section 11 (seal sections 11e, 11f) by the operator is deviated to the x-axis direction from the axial line (z-axis direction) of cut section 15, namely, in a case where the peeling off direction is deviated in the oblique direction or the lateral direction, the break started from the z-axis positive direction end α2 of cut section 15 (first slit 15b) is formed and deviated from the axial line of cut section 15 (first slit 15b) toward the x-axis direction and is, thereafter, connected to slit section 16 (second slit 16a or third slit 16b). This is because slit section 16 includes the axial line deviated from the axial line of cut section 15. Thus, thereafter, the break is formed along slit section 16 (second slit 16a or third slit 16b) via slit section 16. The same matter is applied to first tape 10a.

It should be noted that grip section 13 includes: adhering purpose grip sections 12a, 12b, 12c, 12d mounted to be projected toward both ends in the elongated direction (x-axis direction) of protective tape 10; and peel-purpose grip sections 13a, 13b, 13c, 13d, 13e, 13f mounted so as to be extended in parallel to the axial line of cut section 15 (y-axis direction in the case of first tape 10a and z-axis direction in the case of second tape 10b) and at least one part of peel-purpose grip sections (peel off purpose grip sections 12a, 12b of first tape 10a and adhering purpose grip sections 12c, 12d of second tape 10b) is integrated with (includes integrated portion 120) the adhering purpose grip section (adhering purpose grip sections 12a, 12b of first tape 10a and adhering purpose grip sections 12c, 12d of second tape 10b). That is to say, since peel off purpose grip section 13 is integrated with adhering purpose grip section 12 at both ends of elongated direction (x-axis direction) of protective tape 10 so that the degree of freedom in layout and conveniences are increased.

Figure 5A:
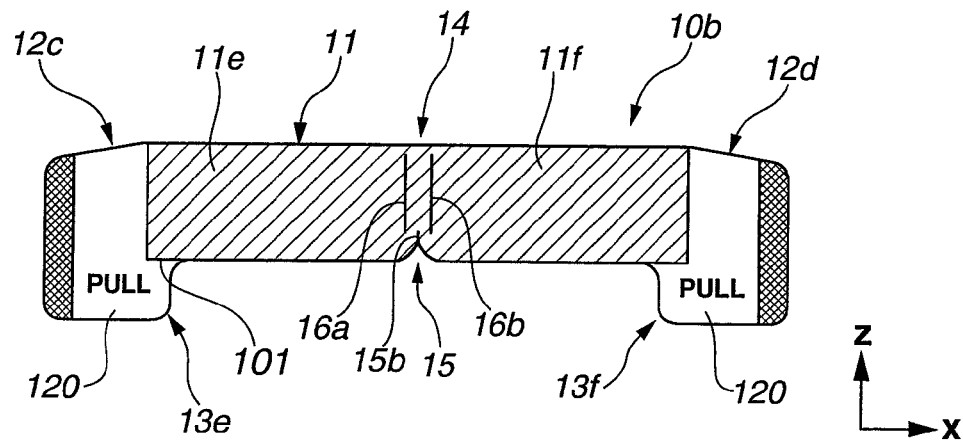
FIGS. 5A, 5B, and 5C are plan views of a comparative example representing a state change when the second tape is peeled off from the housing.
Figure 5B:
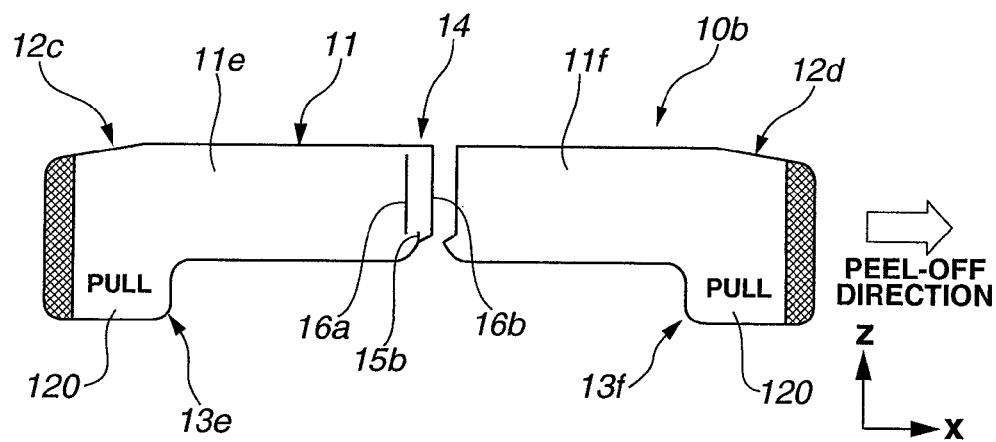
Figure 5C:
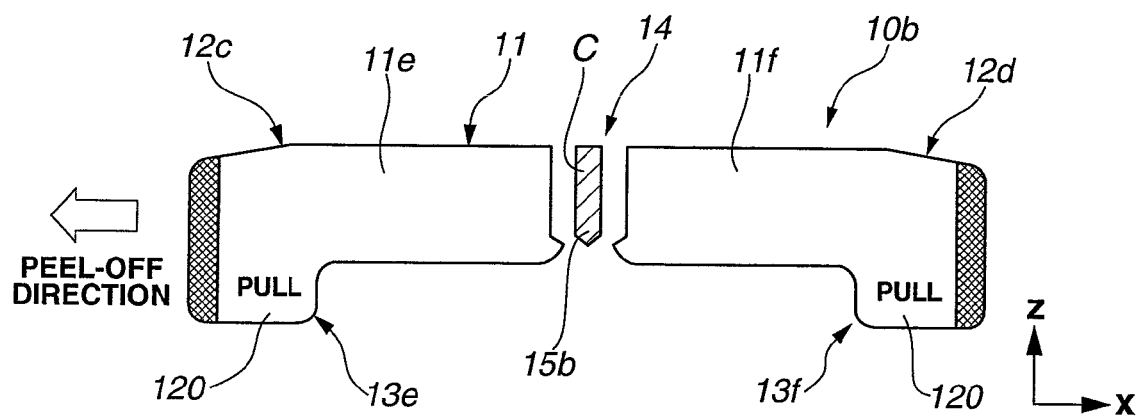

However, the direction in which protective tape 10 is peeled off by means of peel off purpose grip section 13 laid out as described above is easy to be deviated from the scheduled peeling off direction (the axial line of cut section 15) (refer to FIGS. 5A, 5B, and 5C).

In the way described above, even if the peeling off direction is deviated from the axial line of cut section 15, such a situation that the break is generated to be deviated from the axial line of cut section 15 to seal sections 11a, 11b, 11c, 11d, 11e, 11f due to the presence of slit section 16 is suppressed. In other words, slit section 16 serves to suppress that the break is deviated from division section 14 (cut section 15 and slit section 16) and cuts up to the position at which the openings of piping connections 22a, 22b, 22c, 22d, 21a, 21b are covered. As described above, it becomes possible to divide and peel off protective tape 10 at the inner side of slit section 16 (second and third slits 16a, 16b) as a deviation suppression purpose cut section. Hence, main body section 11 becomes easy to be divided and peeled off for each of the openings of piping connections 22a, 22b, 22c, 22d, 21a, 21b in the way as the operator has intended. Thus, the protective function of the openings of protective tape 10 can be improved and the attention to the peeling off direction by the operator is not needed. Hence, the operations are made efficient and the operability can be improved. In addition, while the deviation of the break is suppressed to improve the operability, the cut section (the above-described fourth slit) along the axial line of cut section 15 (first slit 15b) is un-necessitated so that the structure of protective tape 10 can be simplified.

It should be noted that a start end β1 of slit section 16 (second and third slits 16a, 16b) is disposed at the substantially same axial line direction position as final end α2 of cut section 15 (first slit 15b). Hence, even when the peeling off direction by the operator is extremely deviated with respect to the axial line of cut section 15 (first slit 15b), for example, even if the peeling off direction is in the x-axis direction which is the right angle direction to the axial line direction (left and rightward directions with respect to the axial line of cut section 15), the break starting from cut section 15 (for example, final end α2) is easily linked to slit section 16 (second and third slits 16a, 16b). Thus, an effect that the deviation of the break is suppressed independently of the peeling off direction by the operator can be improved. In addition, if the positional relationship between start end start end β1 of slit section 16 (second and third slits 16a, 16b) and final end α2 of cut section 15 (first slit 15b) is set as described above at a stage of design, a possibility such that the deviation of the break can be suppressed can be improved independently of the peeling off direction by the operator even if dispersions due to manufacturing errors are present in a length or a position of cut section 15 or slit section 16.

It should be noted that an axial line direction positional relationship between final end α2 of cut section 15 and start end β1 of slit section 16 is not limited to the above matter. For example, in a case of first tape 10a, α2 is placed at the y-axis positive direction side with respect to start end β1 or may be placed at y-axis negative direction side. In the former case (a case where cut section 15 is overlapped on slit section 16 to some degree of range as viewed from the x-axis direction), the above-described action and effect such that the deviation of the break can be suppressed independently of the peeling off direction by the operator can accurately be obtained. However, in this case, a portion that plays a rigidity of first tape 10a (division section 14) for a force of the x-axis direction is only the position sandwiched between cut section 15 and slit section 16. That is to say, the above-described rigidity is played by the position between cut section 15 and slit section 16 while slightly deformed. In order to increase the rigidity due to the position, it is necessary to increase the x-axis direction width at this position. However, it is an upper limit. On the contrary, in a latter case (a case where cut section 15 is not overlapped with slit section 16 in the x-axis direction), if the x-axis direction width of the position between cut section 15 and slit section 16 is not so increased as described above, the above-described rigidity can be secured according to the position not overlapped. The rigidity in the x-axis direction in division section 14 can be improved. Therefore, even if the force is applied to the x-axis direction when the operator grips adhering purpose grip section 12 and peels off first tape 10a from the pasteboard and is adhered onto housing 2, such a situation that first tape 10a is broken in division section 14 can be suppressed. In this embodiment, since α2 and β1 are installed at the substantially same y-axis direction position, the above-described effect can be obtained which suppresses the deviation of the break irrespective of the peeling off direction by the operator. The rigidity in the x-axis direction in division section 14 can be improved. It should be noted that y-axis direction positional relationship of final end α2 and start end β1 may further be adjusted to maximize these effects synergistically. In this embodiment, division section 14 is disposed between seal sections 11a, 11b, 11c, 11d, 11f and is made facilitated by disposing a slight distance in the x-axis direction between slit section 16 and cut section 15. Hence, even if the cut section is overlapped on the slit section, the rigidity when the position between both sections 15, 16 is deformed is improved so that it is easy to maintain the rigidity against the force in the above-described direction (x-axis direction).

It should be noted that slit section 16 (each of second and third slits 16a, 16b) is constituted by a single cut but may be constituted by a plurality of cuts. Even in this case, as is different from the previously proposed hydraulic pressure unit in which the perforated lines (the cut lines) are linearly arranged at the division position, slit section 16 which is offset from cut section 15 serves to suppress, to some degree, the deviation of the break toward the leftward and rightward directions of division section 14. In this case, it is preferable to set the lengths of the plurality of cuts to be longer than the ordinary perforated lines. In this embodiment, slit section 16 (each of second slit section 16a and third slit section 16b) is constituted by the single cut. Thus, as is different from the case where slit section 16 is constituted by the plurality of breaks, if the break from cut section 15 is linked to any one of locations of slit section 16 (a single cut), the deviation of the break can more accurately be suppressed. Furthermore, in the first embodiment, slit section 16 as a single break is disposed over a major section of division section 14 (for example, first tape 10a is exemplified, about 70% of the y-axis direction size of division section 14). Thus, the above-described action and advantage can be improved.

In this way, in a case where slit section 16 is constituted by a single break (cut section) and the slit is disposed over a major part of division section 14, the part carrying the rigidity to the force in the x-axis direction in division section 14 is only a solid part in which no slit section 16 is disposed. Thus, a problem is raised how the rigidity is secured. In this embodiment, slit section 16 (second and third slits 16a, 16b) is continuously disposed up to a side opposite to peel off purpose grip section 13 of division section 14 and is not opened to this side. Then, slit section 16 (end β2 of second and third slits 16a, 16b) is disposed up to the position slightly before this side. Because of this, the solid section in which no cut (slit) is disposed is left and this portion can play the rigidity in the x-axis direction. It should be noted that, as the fourth slit extended on the axial line of cut section 15 (the extension line of first slit 15b), the single cut which opens the above-described side of division section 14. In this case, as viewed from the single cut opened to the side of division section 14, an overlapped part between slit section 16 (second and third slits 16a, 16b) is reduced. At this time, it is advantageous in that the rigidity in the x-axis direction is secured.

The rigidity in the above-described x-axis direction is carried with this solid portion by adjusting the positional relationship between cut section 15 (of final end α2) and (a start end β1) of slit section 16. The rigidity in above-described x-axis direction is carried by disposing a given distance between slit section 16 and the side of division section 14. In this way, as a two-point support structure supporting division section at both sides, the rigidity in the above-described x-axis direction is effectively improved. In other words, while the rigidity is maintained through the two-point support structure, this makes possible to dispose largely the cut range even in a case where slit section 16 (each of second and third slits 16a, 16b) is constituted by the single cut and the deviation suppression effect of the break is improved. Since, in the first embodiment, the axial line length of cut section 15 (recess section 15a and first slit 15b) is suppressed to about ¼ of division section 14. Correspondingly, the length in the axial direction of slit section 16 as the single cut (cut range) is made large and, at the same time, the distance between supporting points which support the above-described two points is increased. Thus, the rigidity in the above-described x axis direction is improved.

It should be noted that, in a case where slit section 16 (each of second and third slits 16a, 16b) is constituted by the plurality of cuts, the solid portion that carries the above-described rigidity in division section 14 is left dispersed (in the axial line direction of slit section 16) by the number of parts linking the cut section. This can improve above-described rigidity. In this case, one of the plurality of cuts in slit section 16 (second slit 16a or third slit 16b) may be opened to the opposite side to peel off purpose grip section 13. In this case, one of a plurality of cuts of slit section 16 (second slit 16a or third slit 16b) may mutually be offset (for example, as the axial line of each of cuts which is located at the opposite side to peel off purpose grip section 13 becomes spaced apart from the axial line of fist slit 15b in the x-axis direction) so that it becomes less necessary to offset the plurality of cuts in the x-axis direction and install other additional structures. Thus, it is possible to suppress the increase in the x-axis directional size of division section 14 and to simplify the structure of division section 14.

In addition, slit section 16 includes second and third slits 16a, 16b formed at both left and right positions of cut section 15 (the axial line of first slit 15b) and these second and third slits 16a, 16b are extended between the adjacent openings of piping connections 22a, 22b, 22c, 22d, 21a, 21b or between the groups. In this way, since slit section 16 (second and third slits 16a, 16b) is disposed at left and right positions of cut section 15 (first slit 15b), the break is suppressed from being cut deviating exceeding division section 14 even if the peel off direction is deviated toward the left or right side of cut section 15. Hence, the operability when main body section 11 is divided and peeled off for the adjacent openings of piping connections 22az, 22b, 22c, 22d, 21a, 21b or the respective groups. That is to say, it may be thought that slit section 16 (second and third slits 16a, 16b) is placed at either the left or right positions of cut section 15 (first slit 15b). In a case where the direction at which the operator grips the peeling off purpose grip section 13 and pulls it is determined as one of either left or right direction (can be determined), the action and effect described above can be obtained. On the contrary, since, in this embodiment, slit section 16 is disposed at both of left and right sides with respect to the axial line of cut section 15. The above-described action and effect can be obtained by pulling the tape in any one direction. Thus, the directionality of the peeling off operation may not be selected and this can further improve the operability.

It should be noted that the dimension of x-axis direction and y-axis (and z-axis) direction of division section 14 is arbitrary. For example, the y-axis (and z axis) directional size is not always necessary to be the same as the same directional size of main body section 11 (seal section 11a, 11b, 11c, 11d, 11e, 11f) and may be longer or shorter than main body section 11. For example, in first tape 10a, y-axis direction size of division section 14 is larger than main body section 11 and division section 14 may be projected from the side of y-axis negative direction of main body section 11 toward the y-axis negative direction side of main body section 11 and mutually adjacent peel off purpose grip section may be linked by means of division section 14. Even in these cases, since division section 14 (cut section 15 and slit section 16) is disposed as described in the first embodiment. Thus, the same action and effect can be obtained. In addition, the size of first, second, and third slits 15b, 16a, 16b can appropriately be modified. For example, the slit width (gap width) is arbitrary and may substantially zero or may have a predetermined magnitude. In addition, the shape of first, second, and third slits is arbitrary but not linear and, for example, may be bended. Furthermore, the magnitude of division section 14 (cut structure) or the presence or absence of the continuity of the pattern is arbitrary (refer to second embodiment and third embodiment). In addition, in a case where first and second tapes 10a, 10b are integrated, it is possible to dispose division section 14 to peel off selectively (by dividing) the first group of piping connections 22a, 22b, 22c, 22d of the first group connected to the wheel cylinder and the second group of piping connections 21a, 21b in a case where first tape 10a and second tape 10b are integrated. Division section 14 to divide piping connections into each group can function as the division section 14 divided for each piping connection. It should be noted that, in addition to division section 14 which divides the piping connections for each of the piping connections and division section 14 which divides the piping connections for each of the first and second groups may be the same structure, such a structure that division section 14 for dividing for each of the groups can more easily be cut than division section 14 to divide the individual piping connections.

(Action Due to No Provision of Adhesive on Division Section)

In the protective tape of the previously proposed hydraulic pressure unit, adhesiveness is provided for all of positions that are supposed to be adhered to the product side (housing of the hydraulic pressure unit). In the case of the hydraulic pressure unit in which the cut section to divide and to peel off the protective tape (the dotted line or the perforated line), the adhesiveness is provided for the cut section which is the division section. Therefore, according to the peeling off method, the protective tape is left in the product side in the vicinity to the cut section and it takes troublesome when the left tape peels off and there is a possibility that the working efficiency can be reduced. Specifically, when the protective tape is peeled off, there is a possibility that the break is deviated from the dotted line or the perforated line. On the contrary, in hydraulic pressure unit 1 of this embodiment, the adhesive region between outer surfaces 201 and 202 between protective tape 10 and housing 2 is disposed in the region except division section 14 between adhesive tape 10 and housing 2. Specifically, no adhesiveness is provided in the vicinity (division section 14) to cut section (cut section 15 and slit section 16) placed at the position to perform the division for each of piping connections 22a, 22b, 22c, 22d, 21a, 21b. Thus, such an inconvenience that part of division section 14 is left attached onto the product side (housing 2) when protective tape 10 is peeled off from housing 2 can be suppressed and this can improve the operability.

FIGS. 5A, 5B, and 5C show a state change when protective tape 10 in the comparative example (second tape 10b) peels off from housing 2. As shown in FIG. 5A, the protective tape (second tape 10b) in the comparative example is provided with division section 14 (cut structure) in the same way as the first embodiment and adhesive layer 101 (oblique line section in FIG. 5A) is provided at division section 14 (the vicinity to cut section 15 and slit section 16) not only seal section 11e, 11f. As described above, when the operator peels off each seal section 11e, 11f, the direction of gripping and pulling peel off purpose grip section 13e, 13f (the direction of peeling off) is constant in the axial line direction (z axis positive direction) of cut section 15, as scheduled. In this case, the break is formed along the extension line of first slit 15b at the substantially center position in the x-axis direction between seal sections 11e, 11f. In addition, in this case, part of division sections 11e, 11f is not left adhered onto the housing side. However, as shown in FIG. 5B, in a case where a direction of peeling off a certain one of the seal sections 11f is deviated from the axial line of cut section 15 and tape 10b is peeled off, for example, in the right angle direction (x-axis positive direction) to this axial line direction, the break is formed along second slit 16a (such a situation that the break is inserted into seal section 11f is suppressed). Thereafter, as shown in FIG. 5C, in a case where the peeling off direction of the remaining seal section 11e is deviated from the axial line of cut section 15 and the tape is peeled off, for example, in the right angle direction (x-axis negative direction) to this axial line, the break is formed along second slit 16a (this suppresses such a situation that the break is generated and deviated to seal section 11e). However, as denoted by a portion enclosed by the oblique line in FIG. 5C, a position in division section 14 at which the break is deviated from the extension line of first slit 15b (namely, a portion C of slit section 15b sandwiched by second slit 16a and third slit 16b) is left adhered onto the side of housing 2.

On the contrary, in the case of protective tape 10 (second tape 10b) in the first embodiment, as shown in FIG. 4, adhesive layer 101 is disposed on a region except division section 14 and is not disposed on division section 14. Hence, even if, when seal section 11f is, at first, peeled off, the break is deviated from the extension line of first slit 15b and is formed along third slit 16b (a state shown in FIG. 5B), the position (portion C) in division section 14 which is deviated as described above is not adhered to the side of housing 2. Therefore, when the remaining seal section 11e is peeled off, above-described portion C is separated from the housing together with this seal section 11e and is not left on the side of housing 2. It should be noted that, in this embodiment, slit section 16 (second slit 16a and third slit 16b) is formed into the inside of division section 14. However, the present invention is not limited to this. Slit section 16 (at least one of second slit 16a and third slit 16b) may be formed so as to extend on a boundary portion between division section 14 and seal section 11a, 11b, 11c, 11d, 11e, 11f. In this alternative case, such an inconvenience that above-described portion C is left to be adhered to the housing side can be suppressed. In addition, as the cut section of division section 14, cut section 15 and slit section 16 are disposed in the case of the first embodiment. However, the present invention is not limited to this. It goes without saying that, even if a simple (for example, a single line) dotted line or perforated line is provided, the above-described action and effect can be obtained such that the adhesiveness is not provided on a portion of tape 10 in the vicinity to this cut section so that such a inconvenience that part of division section 14 is left on the side of housing 2 can be suppressed. In this embodiment, division section 14 includes above-described cut section 15 and slit section 16. Hence, the peeling-off direction is not constant and not as intended, such a inconvenience that the break is deviated from division section 14 can be suppressed. Hence, as described above, in combination with the advantage that such the inconvenience that the advantage that part of protective tape 10 as described above which is left on housing 2 side can be suppressed, the improvement in the operability can more effectively be achieved.

The region in which no adhesive layer 101 is provided is the whole region of division section 14 but may be the region in which such the situation that part of protective tape 10 is left to be adhered onto the side of housing 2 can be suppressed. Adhesive layer 101 is not always disposed on the whole region of division section 14. It should be noted that the size, shape, and presence or absence of its continuity of the region in which no adhesive layer 101 is provided do not matter. In this embodiment, the region in which no adhesive layer 101 is disposed is assumed as the single region including the cut section (cut section 15 and slit section 16) and the adhesion region in which protective tape 10 and outer surfaces 201, 202 of housing 2 are adhered is disposed in the region except the above-described single region. Hence, the operation such that adhesive layer 101 is coated on tape main body 100 can be simplified and more accurate suppression for such a inconvenience that part of protective tape 10 (vicinity to the cut section) is left on the side of housing 2 can be achieved.

Effect of First Embodiment

Hereinafter, the effects that hydraulic pressure unit 1 exhibits will be listed.

(1) Hydraulic unit 1 includes: housing 2 having a plurality of piping connections 22a, 22b, 22c, 22d, 21a, 21b having the openings exposed to the external or having piping connections 22a, 22b, 22c, 22d, 21a, 21b plurally grouped; and a protective tape (first tape 10a, second tape 10b) having one surface on which adhesive (adhesive layer 101) is adhered to outer surfaces 201, 202 of housing 2, one sheet of the tape simultaneously cover at least two openings or plurally grouped piping connections 22a, 22b, 22c, 22d, 21a, 21b, division section 14 to divide or peel off the tape for the openings of piping connections 22a, 22b, 22c, 22d, 21a, 21b or for the groups of piping connections 22a, 22b, 22c, 22d, 21a, 21b, and the grip section to be gripped by the operator (peeling off purpose grip section 13), the adhesion region by means of the adhesive (adhesive layer 101) between protective tape 10 and outer surfaces 201, 202 of housing 2 being disposed in the region except division section 14.

Hence, since, when the operator grips the grip section (peel off purpose grip section 13) and peels off protective tape 10, such the inconvenience that part of protective tape 10 is adhered onto the side of housing 2 and left thereon can be suppressed, the improvement in the operability can be achieved.

(2) The adhesive (adhesive layer 101) is disposed in the region except division section 14. That is to say, no adhesive (adhesive layer 101) is disposed on division section 14 of the protective tape (first tape 10a and second tape 10b).

As described above, division section 14 is excluded from the adhesive (adhesion layer 101) by adjusting the region of the adhesive (adhesive layer 101) at the side of protective tape 10 (first tape 10a, second tape 10b). Thus, it is not necessary to process the product (outer surfaces 201, 202 of housing 2) as compared with the case where division section 14 is excluded from the adhesion region at the side of outer surfaces 201, 202 of housing 2. The process of only protective tape 10 can be excluded from the adhesion region in a relatively simple structure and the production cost can accordingly be reduced.

(3) Division section 14 includes: main cut section 15 cut (opened to the side to which peel off purpose grip section 13 is connected in protective tape 10) from the side of grip section 13 (in the y-axis negative direction side in the case of first tape 10a and in the z-axis negative direction side in the case of second tape 10b); and sub cut section (slit section 16) having the axial line offset from the axial line of cut section 15, main cut section 15 being formed toward grip section 13 than the sub cut section (slit section 16). Therefore, when the operator grips the grip section (peel off purpose grip section 13) to peel off protective tape 10 (first tape 10a), even if the peeling-off direction is not constant, the presence of sub cut section (slit section 16) can suppress the break from being deviated from division section 14. Thus, main body section 11 can easily be peeled off along division section 14 and the operability can be improved.

(4) Slit section 16 (second slit 16a and third slit 16b) is formed at the left and right positions of cut section 15 (first slit 15b) and is extended between the adjacent openings or among the groups of piping connections 22a, 22b, 22c, 22d, 21a, 21b. Thus, the directionality of the peeling off operation may not be selected and this can further improve the operability.

(5) The grip section includes: an adhering purpose grip section 12 disposed so as to be projected toward both ends in the elongated direction (x-axis direction) of protective tape 10; and peel off purpose grip section 13 disposed so as to be extended in parallel (y-axis direction in the case of first tape 10a and z-axis direction in the case of second tape 10b) to the axial line of cut section 15. At least one part of peel off purpose grip section 13 (peel off purpose grip sections 12a, 12b of first tape 10a and peel off purpose grip section 13e, 13f of second tape 10b) is integrally disposed with each other (has integrated portion 120).

In this way, in a case where the peeling off direction in which protective tape 10 is peeled off by means of peel off purpose grip section 13 (integrated portion 120) is easy to be deviated from the scheduled peeling off direction, the effects of above-described items (1) through (4) can more effectively be obtained.

Second Embodiment

Hydraulic pressure unit 1 in a second preferred embodiment is common to first embodiment in that division section 14 includes cut section 15 and slit section 16, in that cut section 15 is formed to be nearer to peel off purpose grip section 13 than slit section 16, and in that the axial line of slit section 16 is offset to the axial line of cut section 15. However, the second embodiment is different from the fist embodiment in that a plurality of units 14a, 14b, 14c, 14d, 14e, 14f, 14g, 14h, 14i, each unit including cut section 15 and slit section 16, and a connection section 17 to connect cut section 15 to slit section 16 among respective units 14a, 14b, 14c, 14d, 14e, 14f, 14g, 14h, 14i is disposed.

Figure 6:
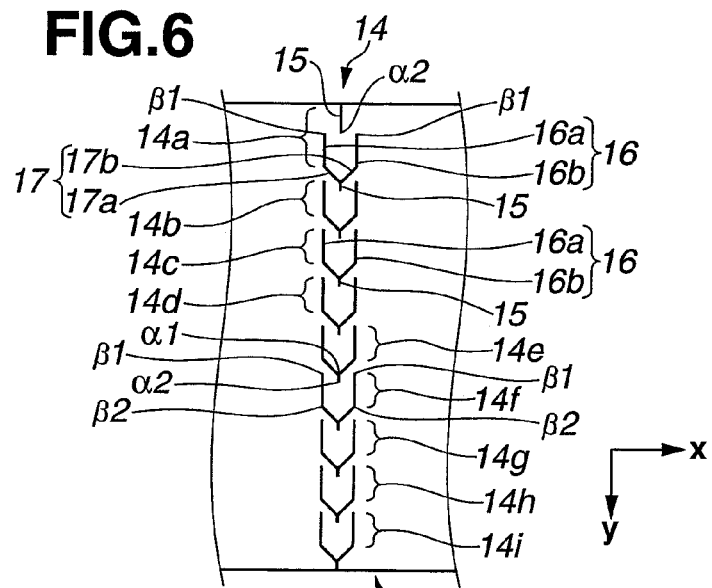
FIG. 6 is an explanatory view representing the division section of the first tape in a second preferred embodiment according to the present invention.

FIG. 6 shows division section 14 of first tape 10a in the second embodiment. For peel off purpose grip section 13 disposed in the y-axis negative direction side of main body section 11, the drawing is omitted. It should be noted that the same structure is applicable to division section 14 of second tape 10b. Cut section 15 is a plurality of slits, each being formed so as to be cut relatively shortly at the substantial center of division section 14 and extended in the substantially straight line in the y-axis direction. Cut section 15 has ten slits and aligned in the substantially same line. Cut section 15 at the end of y-axis negative direction is cut from the side of peel off purpose grip section 13 and is open to the edge of y-axis negative direction side of division section 14. It should be noted that the edge in y-axis negative direction side of division section 14 is cut in substantially triangular shape to form same recess section 15a as in the first embodiment. Cut section 15 at the y-axis positive direction end is open to the edge of y-axis positive direction side of division section 14. It should be noted that cut section 15 at the y-axis positive direction side may be omitted. Slit section 16 is a slit formed relatively short cut among adjacent seal sections 11a, 11b, 11c, 11d, 11d and is offset at the left and right positions of each cut section 15 and is extended in the substantially straight line shape in the y-axis direction. Slit section 16 includes a first slit 16a and a second slit 16b formed at the substantially symmetrical positions with the axial line of cut section 15 sandwiched. Each of the y-axis directional length of first and second slits 16a, 16b is set to be about 3 through 4 times longer than the y-axis directional length of cut section 15.

In the second embodiment, cut section 15 is provided at each of the y-axis positive direction sides (namely, directed toward peel off purpose grip section 13) and the plurality of units 14a, 14b, 14c, 14d, 14e, 14f, 14g, 14h, 14i having slit section 16 (first slit 16a and second slit 16b) are disposed at the y-axis positive direction side, these units 14a, 14b, 14c, 14d, 14e, 14f, 14g, 14g, 14i being aligned in the y-axis direction (substantially in the same straight line). In each of units 14a, 14b, 14c, 14d, 14e, 14f, 14g, 14h, 14i, cut section 15 (start end α1 at the y-axis negative direction side of cut section 15) is formed toward the y-axis direction side than start end β1 in the y-axis negative direction side of first and second slits 16a, 16b, namely, near to (toward peel off purpose grip section 13). It should be noted that start end α1 may be disposed at the y-axis positive direction side than start end β1. In this case, cut section 15 is, wholly, formed toward the y-axis negative direction side than first and second slits 16a, 16b, namely, toward peel off purpose grip section 13. On the other hand, in each of units 14a, 14b, 14c, 14d, 14e, 14f, 14g, 14h, 14i, final end α2 at the y-axis positive direction side of cut section 15 is disposed at a position substantially overlapped on the straight line connecting mutual start ends β1 of first and second slits 16a, 16b of the same units 14a, 14b, 14c, 14d, 14e, 14f, 14g, 14h, 14i or at a side which is more separate from peel off purpose grip section 13 than this straight line (in other words, at a position slightly inserted into the region sandwiched by first and second slits 16a, 16b).

Connection section 17 is constituted by a plurality of slits, each slit thereof being formed in a short cut shape between corresponding two of units 14a, 14b, 14c, 14d, 14e, 14f, 14g, 14h, 14i which are adjacent in the y-axis direction and being extended in a substantially oblique straight line with respect to the y-axis direction. Connection section 17 includes a first connection section 17a and a second connection section 17b, both of first and second connection sections being formed in substantially symmetrically with respect to the axial line of cut section 15. First connection section 17a is formed in the substantially oblique straight line extended obliquely from end β2 in the y-axis positive direction of first slit 16a in a certain one 14a of respective units 14a, 14b, 14c, 14d, 14e, 14f, 14g, 14h, 14i. Second connection section 17b is formed in the substantially oblique straight line extended obliquely from the y-axis positive direction end β2 of second slit 16b in the same unit 14a. First connection section 17a and second connection section 17b are made coincident with (or joined at) the y-axis positive direction side. This junction is coincident with the y-axis negative direction end α1 of cut section 15 of unit 14b which is adjacent to above-described unit 14a at the y-axis positive direction side. In other words, first and second connection sections 17a, 17b are cuts to connect slit section 16 (first and second slits 16a, 16b) of certain unit 14a to cut section 15 of unit 14b which is adjacent to certain unit 14a at the y-axis positive direction side. The angle formed between both connection sections 17a, 17b is set to be slightly smaller than the right angle.

Division section 14 in the second embodiment can provide the same action as division section 14 in the first embodiment, in each of units 14a, 14b, 14c, 14d, 14e, 14f, 14g, 14i. In addition, since connection section 17 is formed, the break is guided between each of units 14a, 14b, 14c, 14d, 14e, 14f, 14g, 14h, 14i so that the break can be suppressed from being deviated from division section 14. Hence, division section 14 in the second embodiment can, as a whole, obtain the same action as division section 14 in the first embodiment.

In addition, as compared with the first embodiment, in division section 14, a portion which carries the rigidity to the force in the x-axis direction in division section 14, namely, the solid portion between cut section 15 and (start end β1 side of) slit section 16 is dispersed and present in the y-axis direction by the number of respective units 14a, 14b, 14c, 14d, 14e, 14f, 14g, 14h, 14i. Therefore, the rigidity of the x-axis direction of first tape 10a can be improved.

Furthermore, an array of each of units 14a, 14b, 14c, 14d, 14e, 14f, 14g, 14h, 14i may be altered and a whole shape of division section 14 (an orbit of the generated break) may be arbitrary not only the straight line shape (refer to a third embodiment as will be described later).

Thus, a degree of freedom of the tape cut shape can be improved.

In addition, since final end α2 of cut section 15 is disposed at a side further separated from peel off purpose grip section 13 than a straight line connecting mutual start ends β1 of first and second slits 16a, 16b (a position slightly entered within the region sandwiched by first and second slits 16a, 16b), the linkage of the break started from (final end α2 of) cut section 15 to slit section 16 (first slit 16a and second slit 16b) becomes easy, even if, in certain one of units 14a, 14b, 14c, 14d, 14e, 14f, 14g, 14h, 14i the direction of force forming the cut is largely deviated with respect to the axial line direction of cut section 15 (for example, when the axial line of cut section 15 of the corresponding one of units 14a, 14b, 14c, 14d, 14e, 14f, 14g, 14h, 14i is deviated with respect to an ordinary peeling off direction by the operator in a case where each of units 14a, 14b, 14c, 14d, 14e, 14f, 14g, 14h, 14i is arrayed non-linearly). Thus, while the degree of freedom of the array of each unit 14a, 14b, 14c, 14d, 14e, 14f, 14g, 14h, 14i is improved, the effect such that the deviation of the break can be suppressed is improved. In addition to the above-described effect, hydraulic pressure unit 1 in the second embodiment has the same effect as first embodiment.

It should be noted that the number of the units and the magnitude of each unit of division section 14 are arbitrary. Each of connection portions between first and second connection sections 17a, 17b and first and second slits 16a, 16b and between first and second connection sections 17a, 17b and cut section 15 are formed respectively in smooth curved lines and may be disposed so as to be smoothly continued. In addition, each of first and second connection sections 17a, 17b may be constituted by a plurality of cuts not by the single cut. In this case, even if the break started from start end β2 of either first or second connection section 17a, 17b is formed out of both of first and second connection sections 17a, 17b at the next unit in a midway through the break reaching to start end α1 of the next cut section 15, this break links to first and second slits 16a, 16b of the next unit (which is arranged such that the axial line is offset to first and second connection section 17a, 17b). If this is achieved, the deviation of the break from division section 14 can be suppressed. It should also be noted that, if the deviation of the break can be suppressed to some degree, several units in the y-axis positive direction side 14h, 14i and so forth may be omitted.

In the second embodiment, adhesive layer 101 is disposed in the region except division section 14 but is not disposed within division 14 (region including each of units 14a, 14b, 14c, 14d, 14e, 14f, 14g, 14h, 14i. Hence, since adhesiveness is not provided in the vicinity to each unit 14a, 14b, 14c, 14d,

14e, 14f, 14g, 14h, 14i, the same action such that, even if the peeling-off direction is not constant (as previously scheduled), the inconvenience such that part of division section 14 is left on the side of housing 2 as described in the first embodiment can be suppressed can be obtained. Since division section 14 in the second embodiment includes the plurality of units 14a, 14b, 14c, 14d, 14e, 14f, 14g, 14h, 14i constituted by cut section 15 and slit section 16 as described above. Hence, the portions (correspond to portion C in FIG. 5C) of division section 14 which might be left on the side of housing 2 due to the deviation of the break from the extension line of cut section 15 are dispersedly present by the number of units 14a, 14b, 14c, 14d, 14e, 14f, 14g, 14h, 14i. Hence, there is a possibility that the plurality of portions which are adhered to housing 2 and left to be adhered thereto are dispersedly present. It takes a lot of time to peel off these portions and there is a high possibility that the operability at the time of peeling off is reduced. On the contrary, since the adhesiveness is not provided for division section 14 (region including each of units 14a, 14b, 14c, 14d, 14e, 14f, 14g, 14h, 14i), the portions at which the break is deviated in each of units 14a, 14b, 14c, 14d, 14e, 14f, 14g, 14h, 14i are not left to be adhered onto the side of housing 2. Hence, the operability when the peeling off is carried out can more effectively be improved.

Third Embodiment

Hydraulic pressure unit 1 in a third preferred embodiment includes division section 14 to which a modification of the second embodiment is applicable.

That is to say, division section 14 in the third embodiment includes the plurality of units 14a, 14b, 14c, 14d, 14e, 14f, 14g, 14h, 14i constituted by cut section 15 and slit section 16. This is common to the second embodiment. On the other hand, division section 14 in the third embodiment is different from that in the second embodiment in that slit section 16 serves as the connection section of slit section 16 to cut section 15 between each unit 14a, 14b, 14c, 14d, 14e, 14f, 14g, 14h, 14i and each of units 14a, 14b, 14c, 14d, 14e, 14f, 14g, 14h, 14i is not arrayed in the same straight line.

Figure 7:
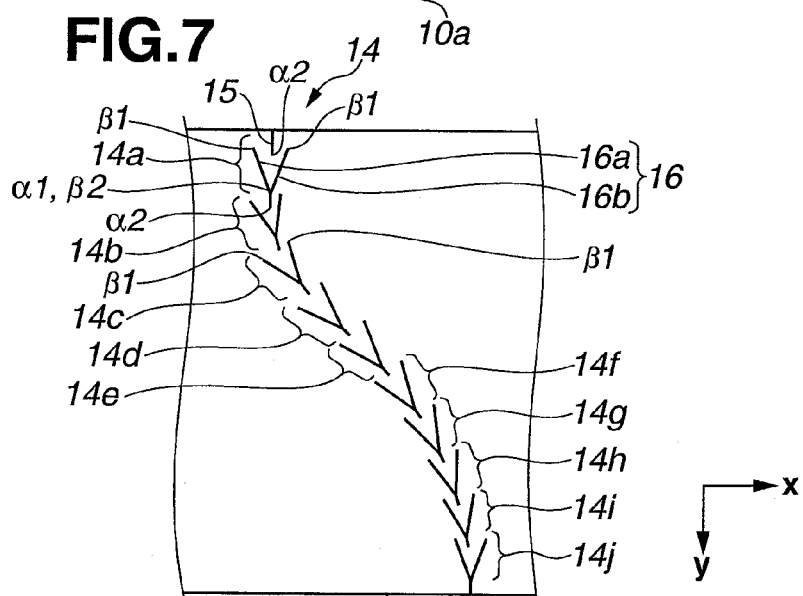
FIG. 7 is an explanatory view presenting the division section of the second tape in a third preferred embodiment according to the present invention.

FIG. 7 shows division section of first tape 10a in the third embodiment. The drawing for peel off purpose grip section 13 disposed at the y-axis negative direction side of main body section 11 is omitted. The same structure is applicable to division section 14 of second tape 10b. Cut section 15 is a relatively short slit extended in the substantially straight line and is constituted by the plurality of slits (eleven). As a whole, the slits are formed in a letter of S. Slit section 16 includes first slit 16a and second slit 16b at substantially symmetrical positions with the axial line of cut section 15 sandwiched. The axial line of first slit 16a is offset to the axial line of cut section 15. Specifically, start end β1 in the y-axis negative direction of first slit 16a in one certain unit 14a is offset to the y-axis positive direction end α2 of cut section 15 of the same slit 14a by a predetermined distance at a right angle direction to an axial center of cut section 15. As first slit 16a advances toward final end 2 at the y-axis positive direction side from start end β1 in the y-axis negative direction side, firs slit 16a is extended in substantially straight line to approach gradually to the axial line of cut section 15 of the next unit 14b. Final end β2 is made coincident with (joined) at the y-axis negative direction start end α1 of cut section 15. In the same way as second slit 16b, second slit 16b is offset to the axial line of cut section 15 of the same unit at start end β1 to be connected to cut section 15 of the next unit at final end β2. In this way, the axial line of second slit 12b is disposed to be slanted to cut section 15. As described above, slit section 16 (first and second slits 16a, 16b) is offset to the axial line of cut section 15 and is formed in the substantially straight line extended obliquely. The angle formed by both slits 16a, 16b is set to be slightly smaller than 45°. The length of both slits 16a, 16b is set to be about 4 through 6 times longer than cut section 15.

In addition, slit section 16 serves as the connection section connecting slit section 16 and cut section 15 between each unit 14a, 14b, 14c, 14d, 14e, 14f, 14g, 14h, 14i. That is to say, slit section 16 is directly connected to cut section 15 of the next unit without intervention of a special connection section. Hence, in the same way as the second embodiment, even if the plurality of units are disposed, the break is guided between each unit 14a, 14b, 14c, 14d, 14e, 14f, 14g, 14h, 14i and the deviation of the break can be suppressed. In addition, since the plurality of cu sections 15 constituting respective units 14a, 14b, 14c, 14d, 14e, 14f, 14g, 14h, 14i are arrayed in a letter of S shape as described above, respective units 14a, 14b, 14c, 14d, 14e, 14f, 14g, 14h, 14i are accordingly bent and arrayed. As viewed from the side at which peel off purpose grip section 13 is connected, namely, as viewed from the array of letter of S shape with the first start point of first unit 14a as the y-axis negative direction side, start end α1 of cut section 15 is formed toward peel off purpose grip section 13 side than first and second slits 16a, 16b (start end β1) of the same unit 14a, 14b, 14c, 14d, 14e, 14f, 14g, 14h, 14i. It should be noted that start end α1 may be disposed at a side (a position slightly entering into the region sandwiched by first and second slits 16a, 16b) separated from peel off purpose grip section 13 (start point of letter S shape array) than start end β1. In this case, cut section 15 is, as a whole, formed toward peel off purpose grip section 13 than first and second slits 16a, 16b. In addition, in each unit 14a, 14b, 14c, 14d, 14e, 14f, 14g, 14h, 14i, final end α2 of cut section 15 is disposed at a position substantially overlapped on the straight line connecting each start end β1 of first slit 16a and second slit 16b of the same unit 14a, 14b, 14c, 14d, 14e, 14f, 14g, 14h, 14i or at the side (the position slightly entering into the region sandwiched by first and second slits 16a, 16b) more separated from the peel off purpose grip section 13 than the straight line Hydraulic pressure unit 1 in the fourth embodiment has the same effect as the second embodiment according to the structure of division section 14. In addition, adhesive layer 101 is disposed in the region except division section 14. Adhesive layer 101 is not disposed in division section 14 (region including each unit 14a, 14b, 14c, 14d, 14e, 14f, 14g, 14h, 14i). In this way, since no adhesiveness is provided in the position placed in the vicinity to respective units 14a, 14b, 14c, 14d, 14e, 14f, 14g, 14h, 14i. Thus, even if the peeling off direction is not constant (as previously scheduled), such the inconvenience that part of division section 14 (each unit 14a, 14b, 14c, 14d, 14e, 14f, 14g, 14h, 14i) is dispersed and left on the side of housing 2 can be suppressed and the operability at the time of peeling off the tape can effectively be improved. This is the action and effect in the third embodiment but is the same action and effect as second embodiment.

Fourth Embodiment

Hydraulic pressure unit 1 in the fourth embodiment is common to each of the first, second, and third embodiments in that the adhesive region between protective tape 10 and outer surfaces 201, 202 of housing 2 is disposed in the region except division section 14. To achieve the above-described common feature, adhesive layer 101 is not disposed in the region of protective tape 10 except division section 14 (namely, no adhesive layer 101 is disposed in division section 14) but an interval (or a gap) is disposed between division section 14 of protective tape 10 and outer surfaces 201, 202 of housing 2 in the fourth embodiment. This is the difference point from each of the first, second, and third embodiments.

Figure 8:
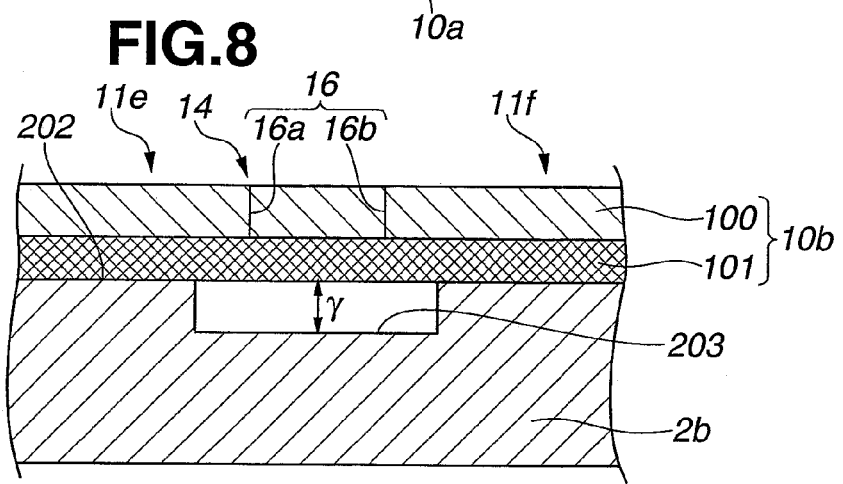
FIG. 8 is a cross sectional view of a part of the housing placed in the proximity to the division section of the second tape in a fourth preferred embodiment according to the present invention (in a direction viewed from lien B-B in FIG. 4).

FIG. 8 shows a cross sectional view in the vicinity to division section 14 (the direction viewed from line B-B in FIG. 4) of outer surface 202 of housing 2 to which protective tape 10 (second tape 10b) is adhered. Adhesive layer 101 is disposed on the whole region of division section 14 not only seal sections 11e, 11f on one surface of second tape 10b. A recess section 203 (a clearance groove) is disposed which is recessed than the other position (surrounding of piping connections 21a, 21b) in the region between the adjacent piping connections 21a, 21b at outer surface 202 of housing 2. This recess section 203 does not tightly adhered between adhesive layer 101 and outer surface 202 in division section 14 of second tape 10b adhered to outer surface 202 so that a gap r between adhesive layer 101 and outer surface 202 is formed. This gap γ causes the portion deviated as described above (refer to portion C in FIG. 5C) in division section 14 not to be adhered onto outer surface 202. Consequently, such the inconvenience that this portion is left to be adhered onto the side of housing 2 is suppressed. The shape and depth of recess section 203 (the magnitude of gap γ) is, desirably, not easy to be contacted on a bottom surface of recess section 203. In outer surface 201 of housing 2 to which first tape is adhered, recess section 203 is disposed in the region between adjacent piping connections 22a, 22b, 22c, 22d, in the same way as outer surface 202. Thus, the same action and effect can be obtained for first tape 10a.

It should be noted that, in the fourth embodiment, recess section 203 is disposed so as to correspond to the whole region of division section 14. However, the region in which recess section 203 is disposed may be the region in which such the situation that part of protective tape 10 is left to be adhered onto the side of housing can be suppressed. It is not always necessary to dispose recess section 203 at the position corresponding to the whole region of division section. It should be noted that the magnitude, the shape, and the presence or absence of its continuity do not matter. In addition, in the fourth embodiment, recess section 203 may be disposed but adhesive layer 101 may not be disposed in division section 14 of protective tape 10. In the fourth embodiment, since adhesive layer 101 is disposed including division section 14, the operation such that adhesive layer 101 is coated on tape main body 100 can be simplified. In addition, recess section 203 is not disposed among all piping connections 22a, 22b, 22c, 22d, 21a, 21b but recess section 203 may only be disposed among part of piping connections. In the latter case, for the region between the piping connections on which no recess section 203 is disposed, adhesive layer 101 may not be disposed in division section 14 of protective tape 10 so that such the situation that part of division section 14 is left on the side of housing 2 is suppressed

Effect of Fourth Embodiment

Hydraulic pressure unit 1 in the fourth embodiment has the same effects as described in items (1), (3), (4), and (5) in the case of first embodiment and, In addition to these effects, has the following effects.

(6) Gap γ between division section 14 of protective tape 14 and outer surfaces 201, 202 of housing 2 is present in a state in which protective tape 10 (first tape 10a, second tape 10b) is adhered to outer surfaces 201, 202 of housing 2. In this way, the clearance groove (recess section 203) is disposed in outer surfaces 201, 202 of housing 2 not excluding division section 14 from the adhering region at the side of protective tape 10 so that division section 14 is excluded from the adhesive region. Hence, since the operation of coating adhesive layer 101 on tape main body 100 can be simplified, the cost can accordingly be reduced.

(7) Since recess section 203 is disposed in the region between adjacent piping connections 22a, 22b, 22c, 22d, 21a, 21b in outer surfaces 201, 202 of housing 2, gap γ us formed by means of recess section 203. Thus, gap γ can be formed in a simple structure only disposition of recess section 203. It should be noted that recess section is not newly formed but gap γ may be formed as conventionally present recess section.

Other Embodiments

Although the forms to achieve the present invention have been explained on a basis of first, second, and third embodiments, the specific structures are not limited to the preferred embodiments. Various changes and modifications may be made without departing from the scope of the present invention. For example, the structure of second and third embodiments may appropriately be combined with the structure of the fourth embodiment.

This application is based on a prior Japanese Patent Application No. 2011-250216 filed in Japan on Nov. 16, 2011. The entire contents of this Japanese Patent Application No. 2011-250216 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A hydraulic pressure unit comprising:
   a housing equipped with a plurality of piping connections having respectively corresponding openings exposed to an external or equipped with a plurality of grouped piping connections; and
   a protective tape including one surface onto which a pressure-sensitive adhesive is disposed so as to adhere the tape onto an outer surface of the housing, one sheet of the tape covering simultaneously at least two of the openings or covering simultaneously the plurality of grouped piping connections, the protective tape including
      a division section configured to divide and peel off a portion of the protective tape for each of the openings of the plurality of piping connections or for each of the grouped piping connections; and
      a grip section arranged to be gripped by an operator,
   wherein an adhesion region of the protective tape which adheres to the outer surface of the housing by the adhesive is disposed on a region excluding the division section,
   wherein the division section includes a cut section which is cut from the grip section side and a slit section whose axial line is offset from an axial line of the cut section.

2. The hydraulic pressure unit as claimed in claim 1, wherein the adhesive is disposed on a region other than the division section.

3. The hydraulic pressure unit as claimed in claim 1, wherein a gap is present between the division section of the tape and the outer surface of the housing in a state in which the protective tape is adhered onto the outer surface of the housing.

4. The hydraulic pressure unit as claimed in claim 1, wherein the cut section is formed at a position of the division section nearer to the grip section than the slit section.

5. The hydraulic pressure unit as claimed in claim 4, wherein the slit section is formed at a symmetrical position to the axial line of the cut section.

6. The hydraulic pressure unit as claimed in claim 5, wherein a final end of the cut section is disposed in a region sandwiched by the slit section.

7. The hydraulic pressure unit as claimed in claim 1, wherein:
the plurality of piping connections are constituted by a first group of piping connections structured to connect to a master cylinder and a second group of piping connections structured to connect to wheel cylinders, and
the protective tape is provided for each of the first and second groups of piping connections.

8. The hydraulic pressure unit as claimed in claim 1, wherein the division section is disposed between mutually adjacent piping connections.

9. A hydraulic pressure unit comprising:
a housing in which a plurality of piping connections are exposed to an external or in which a plurality of grouped piping connections are provided on an outer surface of the housing; and
a protective tape on one surface of which a pressure-sensitive adhesive is disposed, one sheet of the protective tape simultaneously covering at least two openings of the plurality of piping connections or simultaneously covering the plurality of grouped piping connections, the protecting tape having a division section configured to divide and peel off a portion of the protective tape for each opening of the plurality of piping connections or for each of the grouped piping connections,
wherein an adhesive region between the protective tape and the outer surface of the housing is provided on a region other than the division section,
wherein the protective tape includes a grip section arranged to be gripped by an operator,
wherein the adhesive is disposed on a region other than the division section, and
wherein the division section includes a cut section cut from a side of the grip section, and a slit section formed such that an axial line of the division section is offset to an axial line of the cut section.

10. The hydraulic pressure unit as claimed in claim 9, wherein the cut section is formed to be nearer to the grip section than the slit section.

11. The hydraulic pressure unit as claimed in claim 9, wherein the slit section is formed at a symmetrical position with respect to the axial line of the cut section.

12. The hydraulic pressure unit as claimed in claim 11, wherein a final end of the cut section is disposed in a region sandwiched by the slit section.

13. The hydraulic pressure unit as claimed in claim 9, wherein the plurality of piping connections are constituted by a first group of piping connections configured to connect to a master cylinder and a second group of piping connections configured to connect to wheel cylinders, the protective tape being provided for each of the first and second groups.

* * * * *